(12) United States Patent
Brooks

(10) Patent No.: US 8,594,990 B2
(45) Date of Patent: Nov. 26, 2013

(54) EXPERT SYSTEM FOR DESIGNING EXPERIMENTS

(75) Inventor: Brian E. Brooks, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 896 days.

(21) Appl. No.: 12/159,107

(22) PCT Filed: Dec. 29, 2006

(86) PCT No.: PCT/US2006/049657
§ 371 (c)(1),
(2), (4) Date: Oct. 17, 2008

(87) PCT Pub. No.: WO2007/079254
PCT Pub. Date: Jul. 12, 2007

(65) Prior Publication Data
US 2009/0281896 A1 Nov. 12, 2009

Related U.S. Application Data

(63) Continuation-in-part of application No. 11/321,340, filed on Dec. 29, 2005, now abandoned.

(51) Int. Cl.
*G06F 9/45* (2006.01)
*G06Q 30/00* (2012.01)

(52) U.S. Cl.
USPC .................. 703/22; 705/14.4; 705/14.41

(58) Field of Classification Search
USPC ........... 703/2, 20, 22; 705/14.4, 14.23, 14.38, 705/14.41, 14.65, 27.2
See application file for complete search history.

(56) References Cited

U.S. PATENT DOCUMENTS

| | | |
|---|---|---|
| 5,253,331 A | 10/1993 | Lorenzen |
| 5,287,266 A | 2/1994 | Malec |
| 5,309,174 A | 5/1994 | Minkus |
| 5,474,385 A | 12/1995 | Reading |
| 5,513,342 A | 4/1996 | Leong et al. |
| 5,812,134 A | 9/1998 | Pooser |
| 6,023,714 A | 2/2000 | Hill et al. |
| 6,137,483 A | 10/2000 | Kiyono |

(Continued)

FOREIGN PATENT DOCUMENTS

| | | |
|---|---|---|
| GB | 2309805 | 6/1997 |
| JP | 2001-265904 | 9/2001 |

(Continued)

OTHER PUBLICATIONS

"Graphical Interface", Royer, [online],[retrieved from the Internet on Oct. 7, 2005], <http://www.cognitive-aptitude-assessmentsoftware.com/Reporting/GraphicalInterface.html>, 2 pages.

(Continued)

*Primary Examiner* — Kandasamy Thangavelu
*Assistant Examiner* — Andre Pierre Louis
(74) *Attorney, Agent, or Firm* — X. Christina Huang

(57) ABSTRACT

Computer implemented methods and systems for designing a true experiment, and optionally conducting the experiment and analyzing the experimental data are described. Information required to design the true experiment is identified. Questions are presented to a user eliciting responses that provide the required information. The required information is extracted from responses received from the user. The true experiment is designed based on the required information.

17 Claims, 15 Drawing Sheets

(56) References Cited

U.S. PATENT DOCUMENTS

| | | | |
|---|---|---|---|
| 6,169,981 B1 | 1/2001 | Werbos | |
| 6,317,700 B1* | 11/2001 | Bagne | 702/181 |
| 6,529,940 B1 | 3/2003 | Humble | |
| 6,604,092 B1 | 8/2003 | Stewart | |
| 6,604,094 B1 | 8/2003 | Harris | |
| 6,840,905 B2 | 1/2005 | Gotschim | |
| 6,934,415 B2 | 8/2005 | Stentiford | |
| 6,934,748 B1 | 8/2005 | Louviere | |
| 7,089,322 B1 | 8/2006 | Stallman | |
| 7,130,461 B2 | 10/2006 | Rosenholtz | |
| 7,130,808 B1 | 10/2006 | Ranka | |
| 7,136,871 B2 | 11/2006 | Ozer | |
| 7,216,092 B1 | 5/2007 | Weber et al. | |
| 7,260,261 B2 | 8/2007 | Xie | |
| 7,308,497 B2 | 12/2007 | Louviere | |
| 7,406,434 B1 | 7/2008 | Chang et al. | |
| 7,460,708 B2 | 12/2008 | Kayahara | |
| 2001/0018668 A1 | 8/2001 | Yanase | |
| 2002/0026478 A1 | 2/2002 | Rodgers | |
| 2002/0112035 A1 | 8/2002 | Carey | |
| 2002/0129367 A1 | 9/2002 | Devara | |
| 2002/0161779 A1 | 10/2002 | Brierley | |
| 2003/0046376 A1 | 3/2003 | Yen et al. | |
| 2003/0083822 A2 | 5/2003 | Brunner | |
| 2003/0220830 A1 | 11/2003 | Myr | |
| 2004/0015399 A1 | 1/2004 | Maggio | |
| 2004/0015401 A1 | 1/2004 | Lee et al. | |
| 2004/0075685 A1 | 4/2004 | Ohyama | |
| 2004/0088726 A1 | 5/2004 | Ma | |
| 2004/0210471 A1 | 10/2004 | Luby | |
| 2004/0260767 A1 | 12/2004 | Kedem et al. | |
| 2005/0021765 A1 | 1/2005 | Flores et al. | |
| 2005/0039206 A1 | 2/2005 | Opdycke | |
| 2005/0047647 A1 | 3/2005 | Rutishauser | |
| 2005/0055193 A1 | 3/2005 | Bondarenko | |
| 2005/0159921 A1* | 7/2005 | Louviere et al. | 702/181 |
| 2005/0171843 A1 | 8/2005 | Brazell | |
| 2005/0195221 A1 | 9/2005 | Berger | |
| 2006/0049657 A1 | 3/2006 | Searfoss | |
| 2006/0049662 A1 | 3/2006 | Miyahara | |
| 2006/0064339 A1 | 3/2006 | Allred | |
| 2006/0070026 A1 | 3/2006 | Balinsky | |
| 2006/0179418 A1* | 8/2006 | Boyd | 717/100 |
| 2006/0193536 A1 | 8/2006 | Pilu | |
| 2006/0200759 A1 | 9/2006 | Agrawala | |
| 2006/0215922 A1 | 9/2006 | Koch | |
| 2006/0287913 A1 | 12/2006 | Baluja | |
| 2007/0011050 A1* | 1/2007 | Klopf et al. | 705/14 |
| 2007/0038516 A1 | 2/2007 | Apple et al. | |
| 2007/0073562 A1 | 3/2007 | Brice | |
| 2007/0100698 A1 | 5/2007 | Neiman | |
| 2007/0136133 A1 | 6/2007 | Li | |
| 2007/0156382 A1 | 7/2007 | Graham | |
| 2008/0109727 A1 | 5/2008 | Colle et al. | |
| 2008/0230604 A1 | 9/2008 | Fong | |
| 2008/0306804 A1 | 12/2008 | Opdycke | |
| 2009/0012847 A1 | 1/2009 | Brooks | |
| 2009/0012848 A1 | 1/2009 | Brooks | |
| 2009/0012927 A1 | 1/2009 | Brooks | |
| 2009/0030780 A1 | 1/2009 | York | |
| 2009/0158179 A1 | 6/2009 | Brooks | |
| 2010/0017288 A1 | 1/2010 | Graham, II | |
| 2010/0174671 A1 | 7/2010 | Brooks | |

FOREIGN PATENT DOCUMENTS

| | | |
|---|---|---|
| JP | 2002-197403 | 7/2002 |
| JP | 2002-330415 | 11/2002 |
| JP | 2003-529116 | 9/2003 |
| JP | 2004-178276 | 6/2004 |
| JP | 2005-037563 | 2/2005 |
| KR | 10-2003-0027565 | 4/2003 |
| KR | 10-2003-0040263 | 5/2003 |
| KR | 10-2008-0089424 | 10/2008 |
| RU | 2134457 | 8/1999 |
| WO | WO 01-93083 | 12/2001 |
| WO | WO 2006/024108 | 3/2006 |
| WO | WO 2007-078897 | 7/2007 |
| WO | WO 2007-079256 | 7/2007 |
| WO | WO 2009-006542 | 1/2009 |
| WO | WO 2009-006545 | 1/2009 |
| WO | WO 2009-006546 | 1/2009 |
| WO | WO 2010-080722 | 7/2010 |

OTHER PUBLICATIONS

Itti, Short Papers, A Model of Saliency-Based Visual Attention for Rapid Scene Analysis, IEEE Transactions on Pattern Analysis and Machine Intelligence, vol. 20, No. 11, pp. 1254-1259, (1998). (XP001203933).

Itti, A Saliency-Based Search Mechanism for Overt and Covert Shifts of Visual Attention, Vision Research vol. 40, pp. 1489-1506, (2000).

Iurgel, Automatic Media Monitoring Using Stochastic Pattern Recognition Techniques, Doctoral Thesis, Munich University of Technology, pp. 1-163, (2005).

Koch, Shifts in Selective Visual Attention: Towards the Underlying Neural Circuitry, Human Neurobiology, vol. 4, pp. 219-227, (1985).

Krebs, A Simple Tool for Predicting the Readability of a Monitor, Proceedings of the Human Factors and Ergonomics Society, pp. 1659-1663, (2002).

Niederhoffer, Linguistic Style Matching in Social Interaction, Journal of Language and Social Psychology, vol. 21, No. 4, pp. 337-360, (Dec. 2002).

"Statement in Accordance with the Notice From the European Patent Office Dated Oct. 1, 2007 Concerning Business Methods", 1 page. (XP002456252).

Tolli, Motivational and Self-Regulatory Responses to Interruptions, Doctoral Thesis, The University of Akron, pp. 1-235, (May 2009).

White, Implicit Feedback for Interactive Information Retrieval, Doctoral Thesis, University of Glasgow, Department of Computing Science, pp. 1-302, (Oct. 2004).

Search Report for PCTUS2006-048110, 1 page.
Written Opinion for PCTUS2006-048110, 4 pages.
Search Report for PCTUS2006-049657, 2 pages.
Written Opinion for PCTUS2006-049657, 4 pages.
Search Report for PCTUS2006-049662, 2 pages.
Written Opinion for PCTUS2006-049662, 4 pages.
Search Report for PCTUS2008-069068, 3 pages.
Written Opinion for PCTUS2008-069068, 4 pages.
Search Report for PCTUS2008-069076, 3 pages.
Written Opinion for PCTUS2008-069076, 4 pages.
Search Report for PCTUS2008-069077, 3 pages.
Written Opinion for PCTUS2008-069077, 3 pages.
Search Report for PCTUS2010-020006, 3 pages.
Written Opinion for PCTUS2010-020006, 5 pages.

Arch G. Woodside, Measuring Advertising Effectiveness in Destination Marketing Strategies. Journal of Travel Research, Aug. 1990, vol. 29, No. 2, pp. 3-6.

Goldstein, E. Bruce, "Cognitive Psychology, Connecting Mind, Research, and Everyday Experience," Thompson/Wadsworth 2005.

Campbell, D. T., & Stanley, J. C. (1963) *Experimental and quasi-experimental designs for research*, Chicago: Rand McNally.

Don E. Schultz, Market Research Deserves Blame for Marketing's Decline, Marketing News, Feb. 15, 2005.

D. Allison and R. Allison, Statistically Powerful Studies While Minimizing Financial Costs, Physiological Methods, 1997, vol. 2, No. 1, 20-33.

Johnson, Dr. R. Burke, "Chapter 9 Experimental Research", published Jun. 14, 2008. Rettrieved Aug. 30, 2011. <http://www.southalabama.edu/coe/bset/Johnson/lecture/lec9.htm>.

Iurgel, Automatic Media Monitoring Using Stochastic Pattern Recognition Techniques, Doctoral Thesis, Munich Univeristy of Technology, 2005, pp. 1-163.

White, Implicit Feedback for Interactive Information Retrieval, Doctoral Thesis, Univeristy of Glasgow, Department of Computing Science, Oct. 2004, pp. 1-302.

(56) References Cited

OTHER PUBLICATIONS

Niederhoffer, et al. Linguistic Style Matching in Social Interaction, Journal of Language and Social Psychology, vol. 21, No. 4, Dec. 2002, pp. 337-360.

Tolli, Motivational and Self-Regulatory Responses to Interruptions, Doctoral Thesis, The University of Akron, May 2009, pp. 1-235.

Etsukou Ilzuka: Dictionary of Manufacturing Management, Asakura Publishing Co., Ltd, Nov. 1, 1999, first impression of the first edition, pp. 526-534.

Taichiro Ueda: New Data Mining Initiation Course, Data Analysis and Prediction Science, Management Consulting, Japan Small and Medium Enterprise Management Consultants Association, Jun. 1, 2001 vol. 49, No. 6, pp, 78-83.

Niriki, "A Supporting System for Experimental Design RS/Discovery", Computational Statistics, Japan, Japanese Society of Computational Statistics, Dec. 18, 1993, vol. 6, Nos. 1 & 2, pp. 61-65 and English abstract.

Ogata, "Story of Epidemiology—Contact with Radiology—IV. Bias and Confounding", Radiological Sciences, Jitsugyo-Koho Col, Ltd., Apr. 25, 2003, vol. 46, No. 4, pp. 110-115 and English abstract.

"Design Your Own Experiments", Royer, [online],[retrieved from the Internet on Oct. 7, 2005], <http://www.cognitive-aptitude-assessment-software.com/DesignExperiments.html>, 1 page.

"Designer Module", Royer, [online],[retrieved from the Internet on Oct. 7, 2005], <http://www.cognitive-aptitude-assessment-software.com/DesignerModule.html>, 1 page.

"Graphical Interface", Royer, [online],[retrieved from the Internet on Oct. 7, 2005], <http://www.cognitive-aptitude-assessment-software.com/Reporting/GraphicalInterface.html>, 2 pages.

Search Report for PCTUS2006-048110, Jun. 13, 2007, 1 page.
Written Opinion for PCTUS2006-048110, Jun. 13, 2007, 4 pages.
Search Report for PCTUS2006-049657, Jun. 22, 2007, 2 pages.
Written Opinion for PCTUS2006-049657, Jun. 22, 2007, 4 pages.
Search Report for PCTUS2006-049662, Jun. 25, 2007, 2 pages.
Written Opinion for PCTUS2006-049662, Jun. 25, 2007, 4 pages.
Search Report for PCTUS2008-069068, Jan. 21, 2009, 3 pages.
Written Opinion for PCTUS2008-069068, Jan. 21, 2009, 4 pages.
Search Report for PCTUS2008-069076, Jan. 22, 2009, 3 pages.
Written Opinion for PCTUS2008-069076, Jan. 22, 2009, 4 pages.
Search Report for PCTUS2008-069077, Jan. 16, 2009, 3 pages.
Written Opinion for PCTUS2008-069077, Jan. 16, 2009, 3 pages.
Search Report for PCTUS2010-020006, Jul. 16, 2010, 3 pages.
Written Opinion for PCTUS2010-020006, Jul. 16, 2010, 5 pages.

* cited by examiner

EXPERT SYSTEM FOR DESIGNING EXPERIMENTS

FIELD OF THE INVENTION

The present invention relates to an expert system for designing true experiments.

BACKGROUND

Experiments are typically conducted to determine empirically if there are relationships between two or more variables. An experiment may begin with the formation of one or more hypotheses positing that there is a relationship between one or more independent variables and one or more dependent variables. For example, a researcher at a pharmaceutical company might formulate a hypothesis that the amount of a new drug that patients take will be related to the blood pressure of patients. Independent variables are the variables defined or manipulated by the experimenter during an experiment (e.g., the amount and/or frequency of a drug administered to patients). Dependent variables are the variables posited to be predicted by the value of the independent variable (e.g., the blood pressure of patients). The experimenter then conducts an experiment to determine if there is indeed a relationship between the independent and dependent variables (e.g., if the amount of a drug patients receive is related to the blood pressure of patients in a pharmaceutical experiment).

Confounding variables (things that could vary systematically with the levels of the independent variable) may also influence the dependent variable. These confounding variables are not of primary interest in the experiment, yet can influence the dependent variables and therefore obscure an accurate cause and effect relationship between the independent and dependant variables. The experimenter is trying to understand the causal relationships between the independent and dependent variables, however, these confounding variables can render the results of an experiment uninterpretable. Some examples of confounding variables include Hawthorne effects, order effects/carry over effects, demand characteristics, and/or any other factor that could vary systematically with the levels of the independent variables, e.g., such as the body mass of a test subjects in the pharmaceutical experiment discussed above. Confounding variables make it difficult or impossible to know which factor (variable) caused any observed change in the dependent variable(s). And thus, the existence of confounding variables that are not properly controlled during the experiment renders it difficult or impossible to make statistical inferences about causal relationships between the independent and dependent variables. Various types of experiments may be distinguished by the manner and degree to which they are able to reduce or eliminate the effects of confounding variables. The term "true experiment" denotes an experiment in which:

1. There are at least two levels of an independent variable.
2. Samples are randomly assigned to levels of the independent variable.
3. There is some method of controlling for or eliminating confounds.

Experiments that lack any of the above three characteristics are not true experiments, and are often referred to as quasi-experiments or correlational studies. Although, the term experiment is used to describe studies that lack any of the 3 characteristics above, those skilled in the art of experimental design will recognize that these studies are actually quasi-experiments or correlational studies. Only true experiments allow statistical inferences to be drawn regarding the causal relationships between independent and dependent variables. Quasi-experiments and correlational designs may allow relationships between independent and dependent variables to be established, but it is not possible to determine whether those relationships are causal. Various types of experimental designs (including true experiments) have been described, for example, in Campbell, D. T., & Stanley, J. C. (1963) *Experimental and quasi-experimental designs for research*, Chicago: Rand McNally. Only true experiments deliver results unaffected by confounding variables and can empirically determine the direction and strength of causal relationships. However, the complexity of designing a true experiment that appropriately controls for or eliminates confounding variables may be significant. Manually conducted true experiments require time, resources, statistical expertise and deep knowledge of the scientific method, which often prevent wide use today.

It is desirable to design experiments that have a sufficient degree of internal and external validity. Internal validity refers to the confidence with which one can conclude that any change in the dependent variable was produced solely by the independent variable and not due to any extraneous or uncontrolled variables. For example, a blood-pressure drug experiment in which the control group took a placebo pill would be more internally valid than an experiment in which the control group was not given a placebo (because without giving the placebo, the level of the dependent variable (blood pressure) could have been produced by the act of taking a pill or could be caused by the actual chemical composition of the drug) External validity refers to the extent to which the results of an experiment are generalizable or transferable. For example, a blood-pressure drug experiment in which the results can be generalized to all people would be more externally valid than an experiment in which the results could only be generalized to those who have already had a previous heart attack. Designing a true experiment having sufficient internal and external validity may be daunting for investigators who have only a limited knowledge of the statistical and experimental design principles. The expert system described herein provides investigators with a tool for designing experiments without requiring extensive knowledge of the underlying theory of true experimental design. The expert system also aids investigators in conducting the experiments, collecting data, statistically analyzing data, and interpreting the results of the experiments.

SUMMARY OF THE INVENTION

The present invention is directed to an expert system for designing true experiments, conducting the experiments, collecting data, statistically analyzing the data, and interpreting the results of the experiments. One embodiment of the invention involves a computer-implemented method to design a true experiment to evaluate digital signage content. Information required to design a true experiment to evaluate digital signage content is identified. Questions are presented to a user eliciting responses that provide the required information. The responses are received and the required information is extracted form the responses. A true experiment is designed based on the required information extracted from the user responses.

Another embodiment of the invention is directed to a computer-implemented method. The method involves identifying information required to design a true experiment. Questions are presented to the user eliciting responses that provide the required information. The required information is extracted from responses received from the user. The true experiment is designed based on the required information.

Yet another embodiment of the invention is directed to a system. The system includes a user interface configured to a user interface configured to present questions to a user and receive user responses to the questions. The system also includes an experimental design processor coupled to the user interface. The experimental design processor is configured to identify information required to perform a true experiment, generate questions eliciting responses from the user that provide the required information, extract the required information from the user responses, and design a true experiment using the required information.

A further embodiment of the invention is directed to a computer-readable medium having instructions stored thereon and executable by a computing device to perform steps including: identifying information required to design a true experiment, presenting questions to a user, the questions eliciting responses that provide the required information, receiving the responses to the questions from the user, extracting the required information from the user responses, and designing the true experiment based on the required information extracted from the user responses.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

Figure 1A:
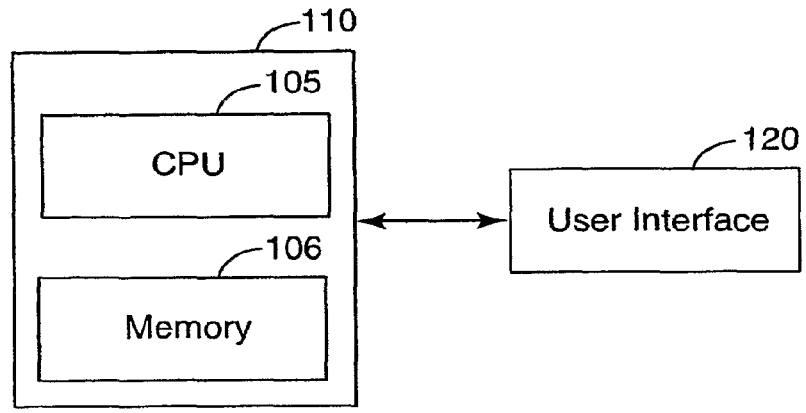
FIG. 1A illustrates components of an expert system in accordance with embodiments of the invention.

While the invention is amenable to various modifications and alternative forms, specifics thereof have been shown by way of example in the drawings and will be described in detail. It is to be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF VARIOUS EMBODIMENTS

In the following description of the illustrated embodiments, reference is made to the accompanying drawings that form a part hereof, and in which is shown by way of illustration, various embodiments in which the invention may be practiced. It is to be understood that the embodiments may be utilized and structural changes may be made without departing from the scope of the present invention.

Embodiments of the invention are related to an expert, computerized system configured to design a true experiment based on input from a user. The computerized system may also automatically or semi-automatically aid the user in performing one or more of steps involved with conducting true experiments, including collecting data, statistically analyzing the data, interpreting and reporting the results of the experiments. The user of the expert system is not required to have knowledge of the underlying theory of experimental design, of statistical/mathematical or algorithmic processes, or deep knowledge of the scientific method.

The expert system, through a series of questions presented to a user, elicits responses from the user that provide the information to design a true experiment. In various embodiments, the experimental data could be input manually (into a system-generated form), or gathered semi-automatically or fully automatically. In some embodiments, the system will automatically manipulate the levels of the independent variables and assign samples to the levels of the independent variable, whereas in others, the system will provide the protocol for independent variable manipulation and sample assignment by the user. The user may be unsophisticated in the field of experimental design and does not need to know how to design, conduct, or analyze the results from a true experiment. The expert system relieves the user of having specific knowledge of the field of experimental design and analysis other than the desire to test a hypothesis, for example. The user provides information to the expert system that allows the system to design the experiment for the user based on the user input. After designing the true experiment, the expert system may also aid in one or more steps in the process of conducting the true experiment, including collecting data, statistically analyzing the data, and interpreting the results of the experiment. In this configuration, the expert system may be capable of automatically conducting the experiment via controlling external systems, e.g., which electronic signs are showing specific content and by automatically parsing data from electronic sources, e.g., manually or automatically organizing sales data according to the experimental conditions.

Knowledge of various concepts integral to the experimental design need not be understood by the user. These concepts are presented to the user so that the terminology and mathematical units correspond to the knowledge base of the user. The expert system is capable of transforming abstract, domain general statistical concepts into semantically meaningful language and data in the domain that the user knows and understands. For example, the expert system could conduct a statistical power analysis in order to calculate sample size requirements for the experiment, but instead of simply reporting the output of the power analysis in terms of sample size (e.g., 680 samples), the system could report the results of the power analysis as the amount of time it would take to conduct the experiment given the specific sample size requirements (e.g., 8 business days). The expert system is capable of automatically transforming data from statistical outputs into business information and/or metrics with the goal of presenting the data in a way that the unsophisticated user can make there decisions, e.g., transforming Z scores into dollars or time, sample size requirements and/or carry over effect elimination into time required to execute the experiment.

The terminology and mathematical units used by the system may correspond to selectable levels of user sophistication. For example, in one selectable configuration, the user can be relatively sophisticated regarding the concepts addressed by the expert system and these concepts may be expressed in terminology and mathematics corresponding to the user's level of knowledge. For example, in this configuration, the user would be asked questions such as "is this variable continuous or discrete?" In another selectable configuration, the user may be unfamiliar with the concepts addressed by the expert system. For the unsophisticated user, the expert system is capable of leading the user through a series of question to determine the information without using technical terminology that the user is unfamiliar with. In this configuration, the user is not required to have knowledge or understanding of how to use of the following examples of concepts that are addressed by the expert system:

Independent variable—The variable manipulated by the experimenter.

Dependent variable—The variable measured by the experimenter.

Confound—Any factor that could vary systematically with the level of the independent variable.

Randomization—The process of randomizing test sample selection and the sample assignment to levels of the independent variable.

Purpose of random selection: Random selection is critical to the external validity of the experiment. Due to the fact that the results of the experiment can only be generalized to the population from which samples are collected, random selection ensures that the results of the experiment can be generalized to the entire population from which the samples were collected rather than some sub-set of the population that is sampled from in a biased (i.e., non-random) fashion. For example, if all of the subjects in a blood-pressure drug experiment were males between the ages of 35 and 40 who were selected because they were easy to include in the experiment because they were already hospitalized for depression, we would not be able to generalize the results of the experiment to the rest of the population (e.g., women over the age of 65). Such an experiment would have lower external validity than an experiment that randomly selected from all people in the United States.

Purpose of random assignment: Random assignment is critical to the internal validity of the experiment. Random assignment guarantees that any effect that is found in the value of the dependent variable is not due to systematic variation in which samples were assigned to the levels of the independent variables. For example, a blood-pressure drug experiment in which samples are randomly assigned to take either the placebo or the drug pill would be more internally valid than one in which all the subjects who were from New York were given the placebo and all subjects from San Francisco were given the drug. Note that one major purpose of random assignment is that if there are no confounds, then the P-value reveals the probability that any effect found is due to the levels of the independent variable vs. random variation. This is not the case in a quasi-experiment or correlational design, where the P-value simply reveals the probability that you are sampling from one or more than one underlying distribution. That is, in a true experiment, the P-value reveals the probability that two means, X and Y are different, and reveals that they are different because of Z (that is, caused by Z) whereas in a correlational study, the P-value just provides information that the means X and Y are different but does not provide information about why they are different (i.e. the P-value does not reveal whether Z caused the difference between X and Y).

Replication—random repeating of experimental conditions in an experiment so that the inherent or experimental variability associated with the design can be estimated. This allows for p-value calculation to assess statistical significance.

Blocking—the arranging of experimental units in groups (blocks) which are similar to one another.

Scales of measurement—Whether a variable is variable is nominal, ordinal, or interval.

Power analysis—Methods of determining sample size requirements for finding an effect of a given size, the width of confidence intervals, and the probability of committing a Type II error (probability of failing to reject the null hypothesis when the null hypothesis is false).

Balancing—Methods of ensuring that each of the IVs and corresponding interaction are independent of each other.

Counterbalancing—A method of controlling for order effects in a repeated measures design by either including all orders of treatment presentation or randomly determining the order for each subject.

Descriptive statistics—Methods of organizing and summarizing data.

Inferential statistics—Procedures for determining the reliability and generalizability of a particular experimental finding.

According to various embodiments described below, methods and devices are described that guide the user to the appropriate use of the above concepts.

Components of an expert system in accordance with one embodiment are illustrated in FIG. 1A. The expert system includes a design processor 110 having various hardware components including a central processing unit (CPU) 105 and memory 106, among other components. The memory 106 stores computer instructions that control the processes for designing the experiment and stores information acquired from the user that are needed for the experimental design. Under control of the software, the CPU 105 algorithmically selects or generates questions to elicit information from a user. The questions are presented to the user via an output device of a user interface 120 that is coupled to the design processor 110. For example, the user interface 120 typically includes a display device, such as a liquid crystal display (LCD) or other type of display device for presenting the questions to the user. The user interface 120 also includes one or more input devices, such as a touch screen responsive to a finger or stylus touch, a mouse, keyboard, voice recognition, or other type of input device. The user enters responses to the questions via one or more input devices(s) of the user interface. The design processor 110 can determine the appropriate descriptive and inferential statistics for the experiment based on the experimental design and the characteristics of the independent and dependent variables.

Figure 1B:
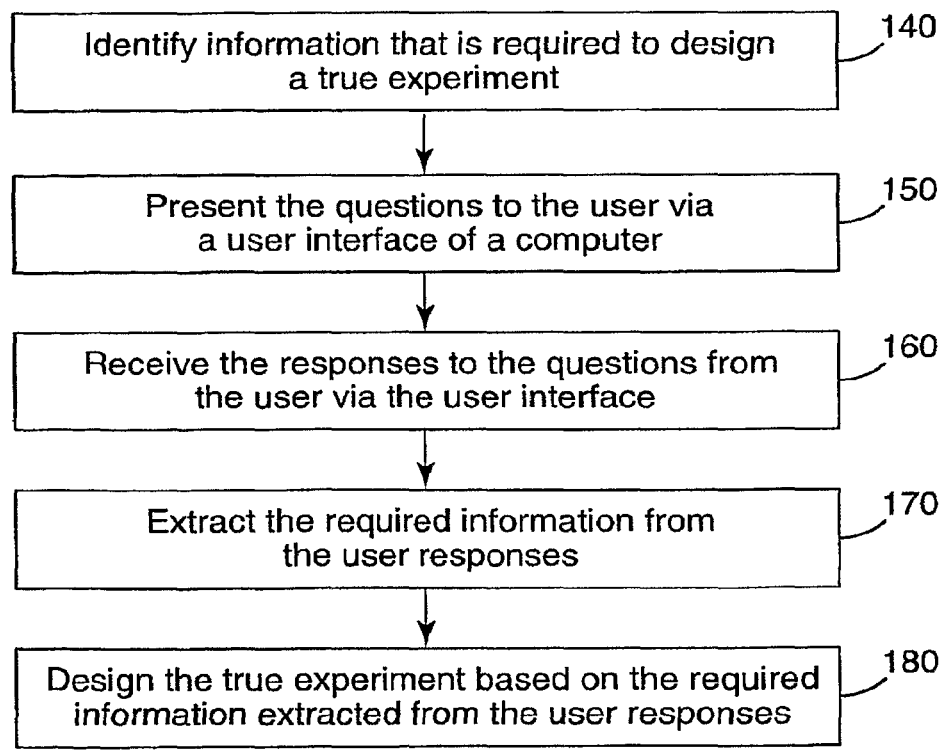
FIG. 1B is a diagram that illustrates processes implemented by the design processor and user interface to design a true experiment in accordance with embodiments of the invention.

The diagram of FIG. 1B illustrates processes implemented by the design processor and user interface to design a true experiment in accordance with embodiments of the invention. The design processor identifies 140 the information required to design a true experiment and selects or generates a series of questions that elicit responses from the user providing the required information. The questions are presented 150 to the user via a user interface. User responses to the questions are received 160 via the user interface and are transferred to the design processor. The design processor extracts 170 information from the user responses and designs 180 a true experiment based on the information. The expert system has the capability to collect information at specific steps that is relevant to other steps. For example, knowledge that the dependent variable is continuous in step X means a particular type of statistical analysis should be used in step Y. The system uses data from previous steps to complete later steps. For example, if the data has already been acquired, the system would not ask the user for the same information again. The user would not need to know that the information was relevant to both steps. If the data were not available from previous steps, the system would ask the user for the needed data.

Figure 1C:
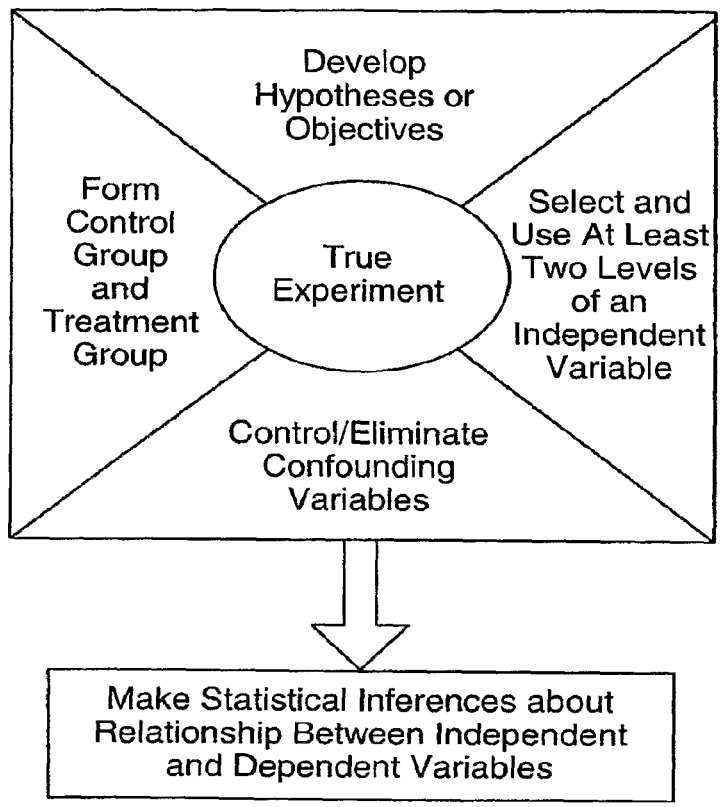
FIG. 1C illustrates elements of a true experiment.

Elements of a true experiment are illustrated in FIG. 1C. A true experiment includes development of a hypothesis or objective. Dependent and independent variables are identified, and at least two levels of one or more independent variable are used. A control group and treatment groups are formed and samples are randomly assigned to levels of the independent variable. There is some kind of method for controlling for or eliminating confounding variables. For example, in a digital signage experiment, the system would guide the user through the process of controlling for carry over effects by 1) balancing and counterbalancing the order with which pieces of content are shown at locations across the network; and or 2) ensuring that two pieces of experimental content are not shown within a block of time in which viewers could see both pieces of content while in the store; and or 3) ensuring that sufficient time has elapsed before data are collected between when the content switches from one version of experimental content and another version of experimental content such that at least 95% of possible viewers who were in the store at the time of the content change would have left the store. If all of these elements are appropriately applied, the experiment produces results that can be used to make statistical inferences about the relationship between the dependent and independent variables. The expert system described herein allows a user who is unsophisticated in the complexities of true experimental design to design an experiment that produces substantially confound-free results and can be used to determine and quantify any causal relationship between independent and dependent variables.

Embodiments of the invention are directed to an expert system that has the capability of designing a true experiment based on user input. As previously mentioned, the use of the expert system relieves the user of having any foundation in the theory or practice of experimental design. A true experiment has at least two levels of an independent variable. The expert system elicits information from a user required to choose independent and dependent variables for the experiment. For example, in a digital signage experiment, the expert system might ask the user questions such as: "If content X (where X is any piece of content in which the user wants to experimentally evaluate) is effective, what are the changes in the word that you would expect to happen as a result of showing content X? The system would provide a number of possible changes such as: sales of a particular product will increase; foot traffic in a particular location in the store will increase; consumers will inquire with staff regarding the features of a particular product; consumers will pick a particular product off the shelf; and other, where other is any other change that is not included in the system's stored set of possible changes. Those skilled in the art will appreciate that each of these possible "changes in the world" correspond to a possible dependent variable that could be measured in an experiment designed to test the effectiveness of content X. Likewise, the expert system could guide the user through the process of picking control content analogues to a placebo in a drug study. For example, the expert system would ask the user to identify content that would not be related in any way to the goal of content X. With respect to threats to internal validity, the expert system, via the sequence of questions and user responses, identifies threats to internal validity, and may initiate processes for controlling these threats, such as through balancing, counterbalancing and/or blocking, and/or randomization. The expert system, based on user input, is capable of implementing processes for assigning samples randomly to groups so that each sample in an experiment is equally likely to be assigned to levels of the independent variable. The expert system is also capable of designing an experiment that includes randomization, counterbalancing and/or blocking. The system may assist the user in selecting independent variables or levels of independent variables, and assists the user in selecting dependent variables based on factors associated with internal and/or external validity of the experiment. For example, the system could obtain the necessary information to conduct power analyses on various combinations of independent and dependent variables, provide the user with the results of the various power analyses the domain specific terms and values that the user understands ("Using sales data to measure the effectiveness of this piece of content would take 8 weeks and cost $1400 whereas using sensor data would take 2 weeks and cost $800).

Figure 1D:
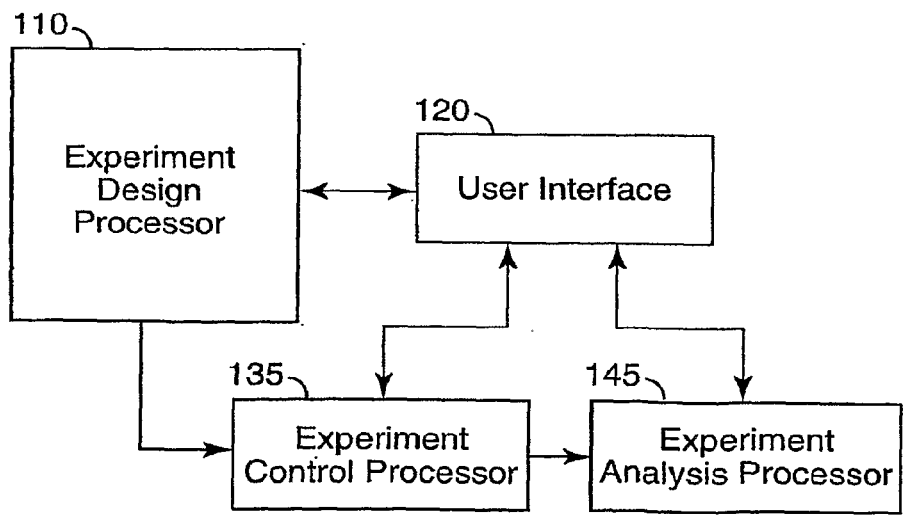
FIG. 1D is a block diagram illustrating a system configured to design a true experiment, conduct the experiment, analyze experimental data and/or interpret the results of the true experiment in accordance with embodiments of the invention.

In some configurations, in addition to designing the true experiment, the expert system may aid the user in performing one or more of conducting true experiments, collecting data, statistically analyzing the data, and interpreting the results of the experiments. An embodiment of the expert system that includes the capability for conducting, analyzing and interpreting experiments is illustrated in FIG. 1D. In addition to the experiment design processor 110 and user interface 120 previously described, the expert system may also include an experiment control processor 135 configured to automatically or semi-automatically control the execution of the experiment. An experiment analysis processor 145 may also be included that is configured to analyze the experimental data and/or interpret the results of the experiment. The functions of the control processor 135 and the analysis processor 145 are enhanced through knowledge of how the experiment was designed by the design processor 110.

For example, because the analysis processor 145 will have received information regarding the independent and independent variables (e.g., whether the independent variables (UVs) and dependent variables (DVs) are continuous or discrete), the analysis processor 145 would have much of the necessary information to choose the appropriate statistical test to apply to the data from the experiment. For example, if there is one IV with two discrete levels and one continuous DV, then a T-Test may be selected by the analysis processor 145 for the inferential statistical test whereas if there is one IV with two discrete levels and one DV with two discrete levels, then a Chi-Squared test may be used for the inferential statistical test. Likewise, because the analysis processor 145 will have access to information from the design processor 110 regarding which experimental conditions are diagnostic of particular hypotheses, the analysis processor 145 would have most or all of the information needed to determine which experimental and control conditions should be statistically compared and reported to the user.

The computer-based approaches to experimental design described herein involve a computerized digital signage information system. The present invention is not limited, however, to the fields of communications systems or to digital signage. The approaches of the present invention may be applied to design a true experiment regardless of the field of interest. For example, the methods and systems described herein may be applied to the design of experiments for any number of subject areas, including, but not limited to, any sort of digitally delivered messaging, such as print media, digital signage, and/or internet delivered advertisements, as well as experiments related to biology, chemistry, linguistics, medicine, cognitive sciences, social sciences, education, economics, and/or other scientific fields.

The examples are described in the context of an expert system configured to design experiments to evaluate digital signage content. As will be appreciated, the expert system may alternatively or additionally be programmed to evaluate other types of content, or may be programmed to design experiments other than content evaluation experiments. The expert system example described below allows the reader to develop an understanding of the principles of the invention which generally span all fields of scientific endeavor.

The flow diagram illustrated in FIGS. 2A-2E provides an overview of processes that may be implemented by the design processor 110 (FIGS. 1A and 1D) in accordance with embodiments of the invention. The flow diagram illustrates steps in the design of a true experiment that, in accordance with various embodiments of the present invention, may be implemented by the expert system by prompting the user to provide needed information. The expert system prompts the user to supply information by presenting questions to the user. The expert system receives the user responses, and extracts information needed for the experiment from the user responses. FIGS. 3A-3P are screen shots of a display screen illustrating questions that may be presented to the user for some of the processes indicated in the flow diagram of FIGS. 2A-2E. The example screen shots present questions corresponding to an experiment to test for and measure causal relations between digital signage content and sales in a coffee shop in a hotel. Various advertisements are presented on digital displays positioned in various locations. This example is used to illustrate processes that may be implemented by the expert system in designing a true experiment. Those skilled in the art will recognize that this exemplary process for designing the coffee shop experiment may be extrapolated to any experiment by presenting questions to the user to acquire the needed information to design the particular experiment of interest.

Figure 2A:
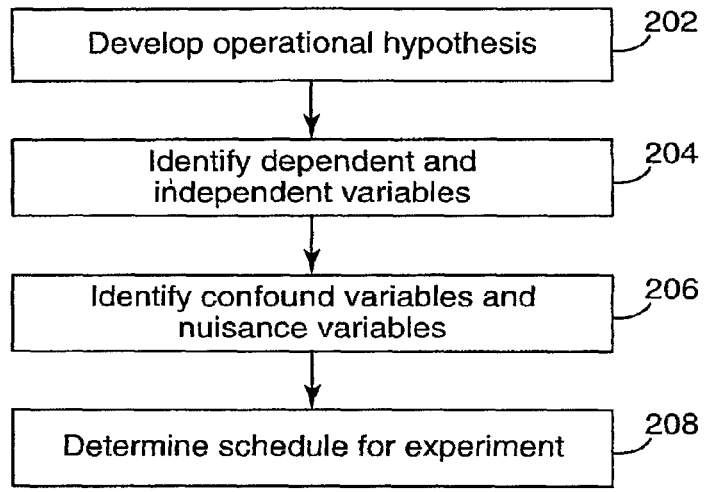
FIGS. 2A-2E show a diagram that provides an overview of processes that may be implemented by the experiment design processor in accordance with embodiments of the invention.
Figure 3A:
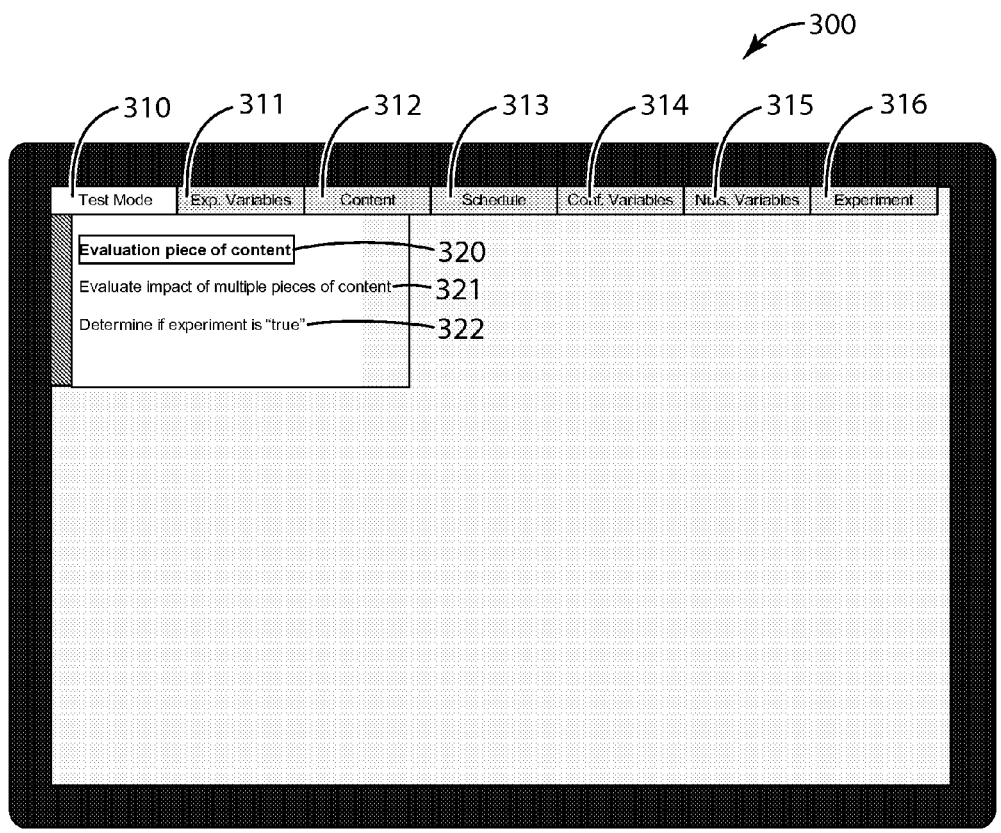
FIGS. 3A-3P are screen shots of a display screen illustrating questions that may be presented to the user for some of the processes used for designing true experiments in accordance with embodiments of the invention.

As illustrated in FIG. 2A, the process used by the expert system for designing the true experiment includes developing 202 an operational hypothesis and identifying 204 the independent and dependent variables of the experiment including whether the variables are discrete or continuous and what IV levels should be tested. With input from the user, the expert system identifies 206 confound and nuisance variables and determines 208 the schedule for which experimental and control content are shown across the digital displays in order to execute the experiment.

Figure 2B:
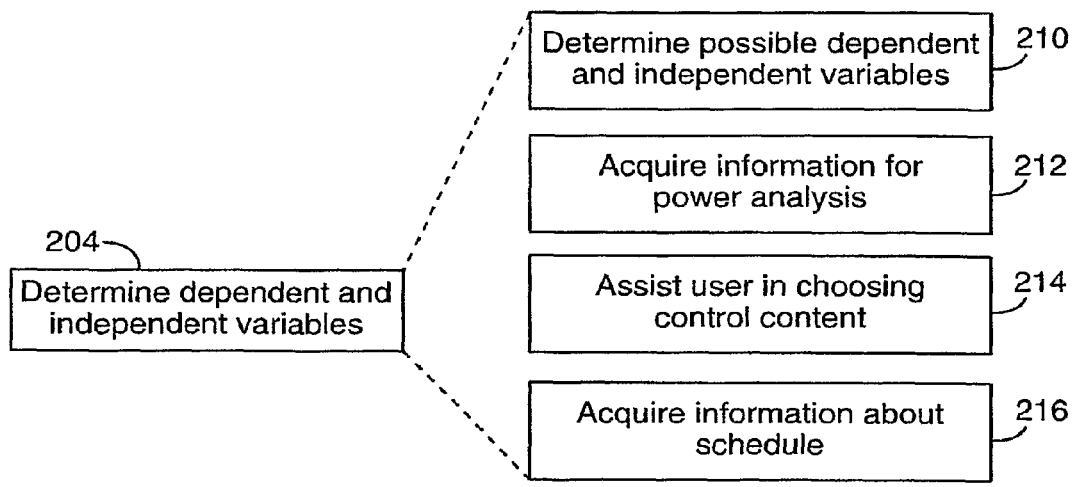

FIG. 2B illustrates in more detail several optional processes associated with identifying 204 the experimental variables. The expert system may obtain information for identifying 210 possible dependent and independent variables and acquire 212 information from the user so that power analyses can be performed. The expert system may assist 214 the user through a process for choosing control content and may acquire 216 information from the user about the experimental protocol, which in the context of digital signage involves the schedule for displaying content across the digital signage network. The schedule includes the locations and times that content is played across the digital signage network.

Figure 2C:
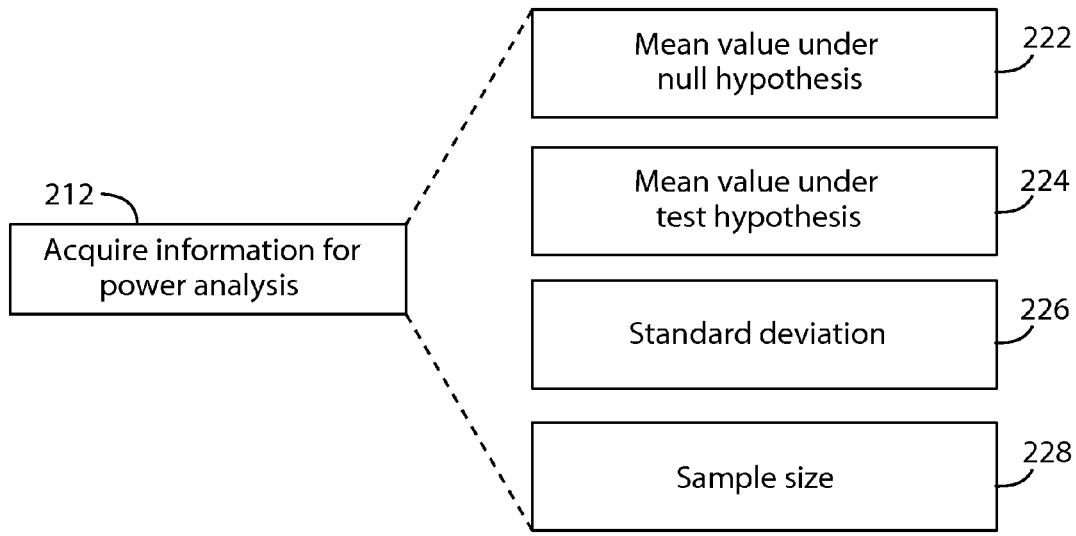

FIG. 2C illustrates in more detail processes for acquiring 212 information to perform a power analysis. The power analysis allows the expert system to determine the probability that the experiment will detect an effect of a given magnitude. The information acquired during this stage may also be used to determine the sample size needed for the experiment to have a pre-specified amount of statistical power. Power analysis solves for one of three parameters that is not provided from two others that are. The parameters for power analysis are: sample size, power, effect size. The expert system may walk the user through choosing which of these they care the most about, and help optimize the experimental design. For example, if the user says they are not interested in an effect unless it is larger than X, the power analysis would be conducted such that the experiment has sufficient power to find an effect at least as large as X.

A power analysis requires the following information to be estimated: the mean value under the null hypothesis 222, mean value under the test hypothesis 224, standard deviation 226, and the sample size 228. These parameters are estimated via a series of simple questions presented to the user as illustrated in more detail in FIG. 3. When the standard deviation is unknown, historical data might provide the basis for the estimate. When there are no historical data, a reasonably good approximation would be to use the largest value that the dependent variable could be minus the smallest value that it could be and divide this difference by 4 (this provides a conservative estimate of the standard deviation)

Figure 2D:
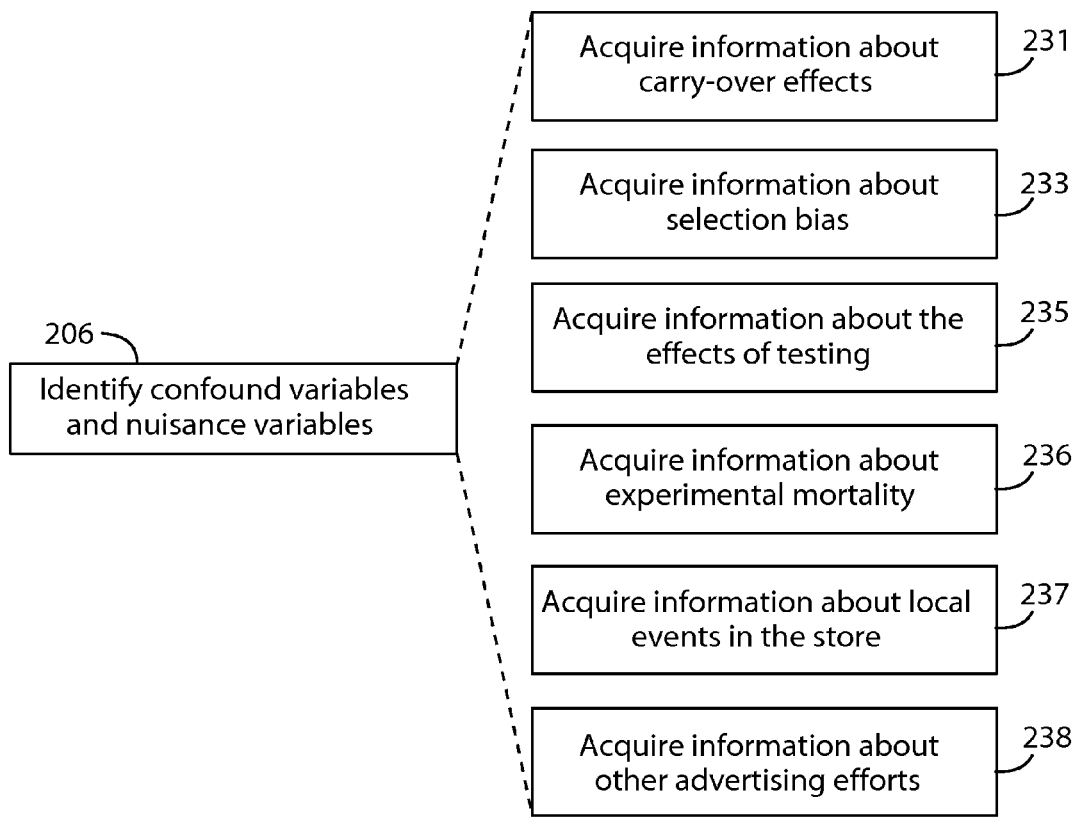

FIG. 2D illustrates in more detail several optional processes for identifying 206 confound and nuisance values. Confound variables are any variable that varies systematically with the levels of the independent variable. For example, if a piece of control content is always followed by a piece of content that warns of increased terror threat level whereas a piece of experimental content is always followed by an advertisement for sleep comfort beds, any difference in sales in the coffee shop when the control or experimental content is playing could be due to the difference in the control vs. experimental content or it could be due to the content that followed each piece of experimental and control content. Examples of confounds include: regression to the mean, order effects, carryover effects, floor-effects, ceiling effects, Hawthorne effects, and demand characteristics.

Nuisance variables are variables that do not vary systematically with the levels of the IV but that can reduce statistical power for the coffee shop experiment. For example, provided correct randomization, hotel occupancy rate would be a nuisance variable. In two experiments where one hotel has more variability in occupancy rates and another has less variability, if all else is equal (e.g., same sample size) the statistical power would be greater in the hotel with less occupancy variability. Examples of nuisance variables in a digital signage experiment include: other promotional activities, weather, day of week, economic conditions. The expert system acquires information about possible confound and nuisance variables by presenting a series of questions that elicit user responses that contain information about these variables. As illustrated in FIG. 2D, the expert system may present a series of questions designed to acquire information about carry over effects 231, selection bias 233, the effects of testing 235 which involves any difference in outcomes that is due to samples being treated, in any way differently, than they would if they weren't being subjected to the levels of the IV in a controlled experiment (e.g., being watched by someone with a clip board might change how you would normally respond to seeing a piece of content), experimental mortality 236, local events that may effect the experiment 237, and information about other advertising or promotional efforts 238, for example.

Figure 2E:
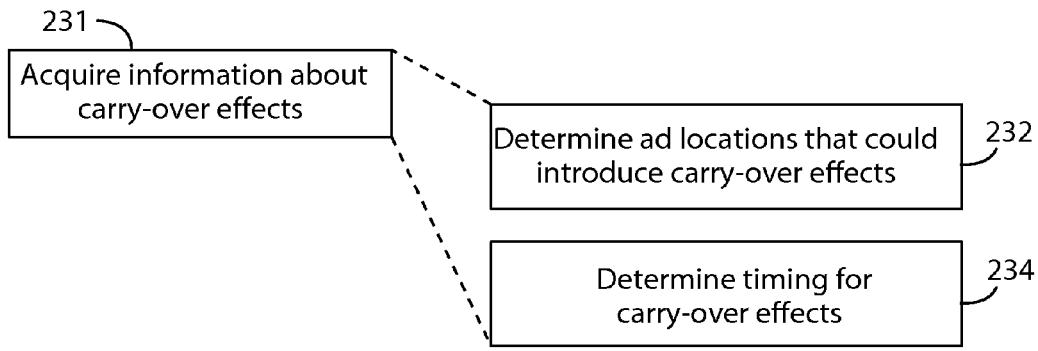

FIG. 2E illustrates in more detail several optional processes that may be performed by the expert system to acquire information 231 about carry over effects. The expert system presents a series of questions to the user for obtaining 232 information about content shown at other locations. Another series of questions elicits 234 responses from the user including information about the timing of content that could produce carry over effects.

The expert system leads the user through any or all of the processes described above to acquire the information needed to perform a true experiment. FIG. 3A illustrates an exemplary display 300 that may be used to present questions to the user and receive user responses. The display 300 illustrated in FIG. 3A is a touch sensitive display, although any type of input and output devices suitable for presenting questions to a user and receiving user responses, such as a non-touch sensitive display, may be used. The touch sensitivity of the display allows for user responses to be input via touches to the display screen. It will be apparent that any type of input device suitable for receiving responses from a user, including mouse, keyboard, and/or microphone with voice recognition circuitry may be used.

In this example, the display 300 includes a question/response viewing area 305 and various pull down menus 310-316 that may be activated by a touch from the user to facilitate gathering information. Each pull down menu 310-316 corresponds to a different area of questioning and/or a different aspect of the experimental design which is indicated by the title of the menu. The menus 310-316 exemplify the highest level in a hierarchical menu structure. When selected, a pull down menu 310 may reveal one or more sub-menus 320-322 which correspond to the next highest hierarchical level in the menu structure. Selection of a sub-menu 320-322 may cause additional menus to be presented. Presentation of sub-menus in the hierarchical structure may continue as needed to achieve the level of specificity required by the area of questioning or experimental design operations associated with the menu structure. A touch screen allows menus and/or sub-menus to be pulled down and/or a menu item activated by touching the menu title or menu item.

It will be appreciated that the menus illustrated in FIG. 3 represent a subset of possible menus that may be used for the expert system. For example, other menus that could be used include menus directed to acquiring additional information for designing the experiment, or menus directed to acquiring information used in conducting or analyzing the experiment.

The expert system may operate in various modes, for example, the activation of a menu item is typically performed by the expert system as the system leads the user through the experimental design process. In some embodiments, the user may interact with the control processor and/or analysis processor to provide input regarding the performance of the experiment, analysis of the experimental data, and/or interpretation of the experimental results.

Menu items may also be accessed by the user, if desired. For example, the expert system may initially step through a process of obtaining information by activating operations associated with various menu or sub-menu items. The user may, if desired, return to various stages of the process, by re-activating the menu item. For example, the user may desire to return to a menu item to change a previously entered input and may conveniently do so through use of the pull down menus 310-316.

The screen 300 illustrated in FIG. 3A illustrates a menu 310 titled "Test Mode." If the user activates the Test Mode item, then the screen displays one or more questions related to determining the independent variables of the experiment. As previously discussed, in this example, the expert system is configured to design experiments to analyze digital signage content, such as graphics or video clips displayed on a digital display, although the system could be configured to design experiments for other types of applications. When the menu item 310 "Test Mode" is activated, the user has the option of choosing between sub-menu items 320-322. The user may choose either "Evaluate an individual piece of content" indicating the user would evaluate a piece of content relative to no content or placebo content or "Evaluate the relative impact of multiple pieces of content" indicating the user has two advertisements that he/she could like to compare or "Determine if an experiment is 'true'." FIG. 3A depicts the scenario where the user has selected to evaluate an individual piece of content as indicated by the highlighted sub-menu item 320. Selection of this option initiates a process controlled by the expert system to acquire information from the user that is required to design an experiment to evaluate an individual piece of content. The expert system proceeds to the next step in the process involving determining the experimental hypothesis and dependent variables for the experiment by activating another menu item, as illustrated in FIG. 3B.

Figure 3B:
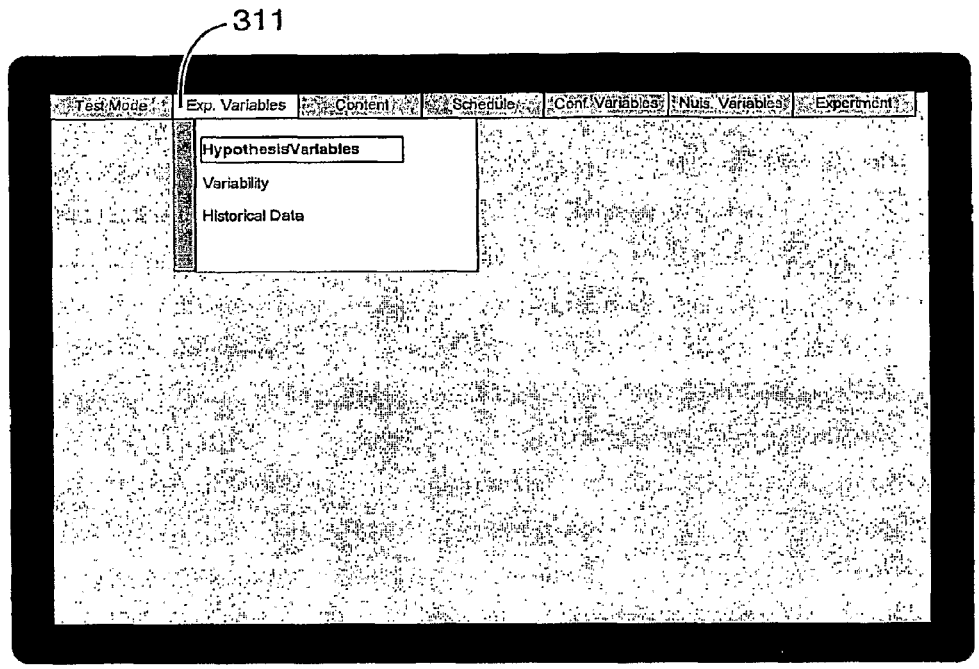
Figure 3C:
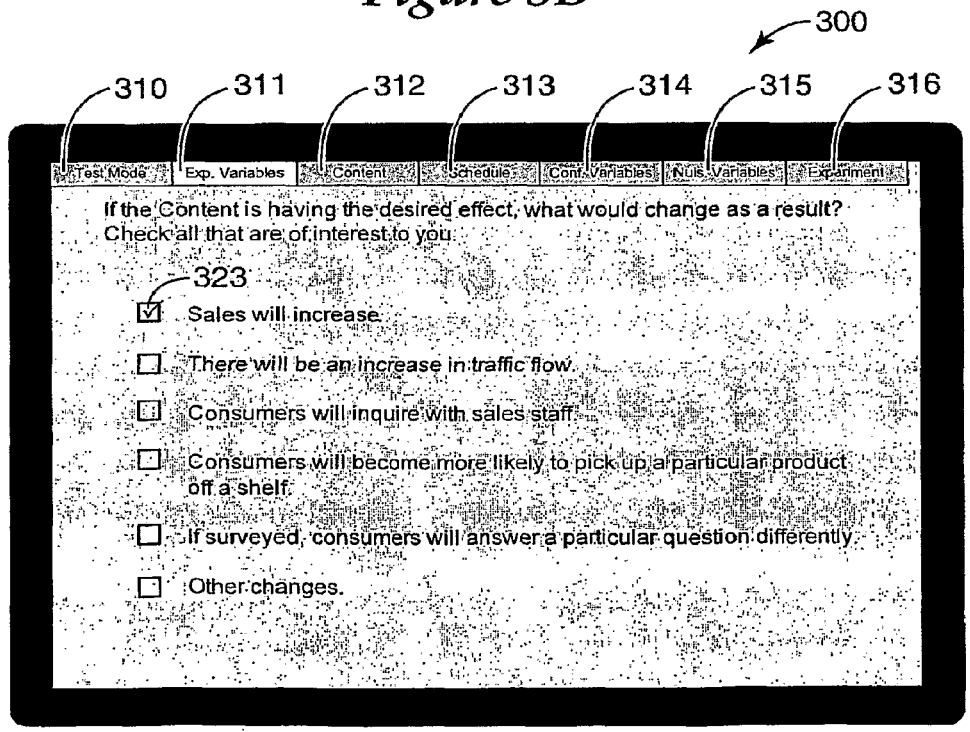
Figure 3D:
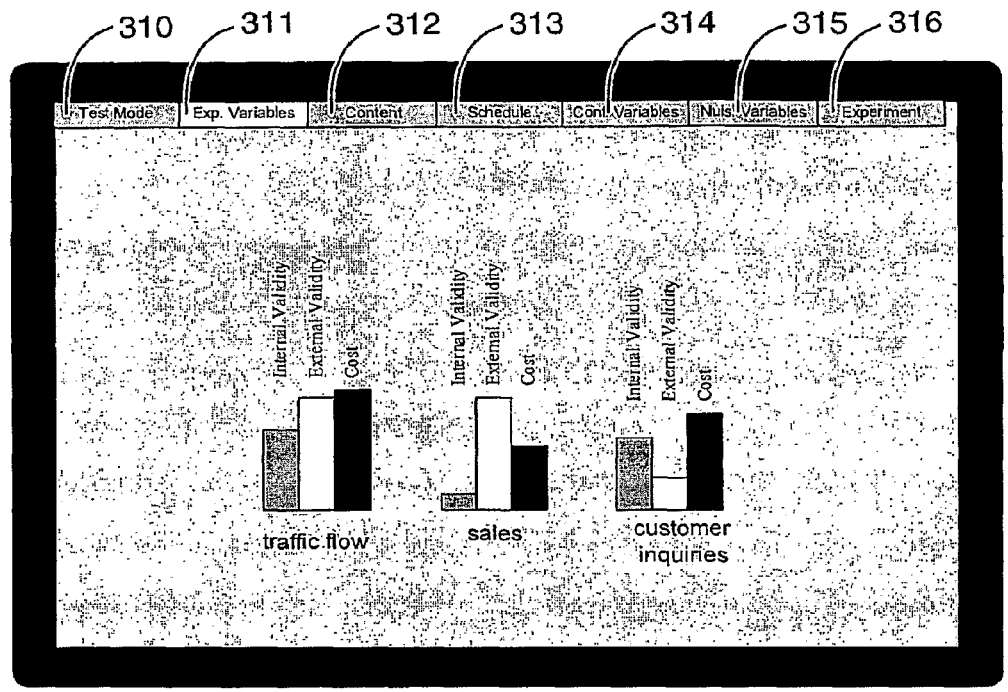

FIG. 3B shows the selection of the menu item 311 entitled "Exp. Variables." (abbreviating Experimental Variables). When pulled down, the menu 311 reveals list of sub-menu items titled "Hypothesis/Variables," "Variability," and "Historical Data." Activation of a sub-menu item causes a series of questions and/or choices to be presented to the user. For example, if the menu item hypothesis/variables is activated, the screen may display a number of choices as indicated in FIG. 3C to develop the hypothesis or hypotheses of the experiment and to determine possible dependent variables for the experiment. In one scenario, as illustrated in FIG. 3C, the following question is presented to the user: "If the content is having the desired effect, what would change as a result? Check all that are of interest to you." The user may choose one or more of the following responses: "Sales will increase," "There will be an increase in traffic flow," "Consumers will inquire with the sales staff," "Consumers will be more likely to pick up a particular product from the shelf," "If surveyed, consumers will answer a particular questions differently," "Other changes." In the particular example of FIG. 3C, the user has selected item 323 "Sales will increase." This selection provides information to the expert system that identifies the experimental hypothesis as follows: If the digital signage content is shown to customers, sales will increase. The information also provides a dependent variable in the experiment, i.e., a change in sales caused by displaying the content. In other scenarios, one or more additional possible dependent variables, e.g., traffic flow, consumer inquiries, consumers picking up product, and/or answers to survey questions may be selected by the user. If multiple dependent variables are indicated, the expert system will calculate the cost of the experiment, estimate the internal and external validity of the experiment for each dependent variable and lead the user through the process of selecting appropriate dependent variables. FIG. 3D illustrates one portion of the process that the expert system may use to lead the user through selecting one or more dependent variables when multiple selections are made in the process step illustrated by FIG. 3C.

In some scenarios, none of the offered choices illustrated in FIG. 3C corresponds to a change expected by a user and the user may select "Other." If so, the expert system leads the user through an additional series of questions to identify and characterize the possible dependent variable(s) for the experiment. For example, if the user selected "Other," some of the questions may be directed towards determining if the possible dependent variable is continuous or discrete. The user could have discrete data which is categorical or nominal (for example, male and female). Discrete variables could be ordered categories called ordinal data (for example, age categories 20-29, 30-39, etc.). Continuous data come from a variety of measurement techniques, where there is an underlying continuum. As an example, scale ratings on a survey on a liking scale ranging from totally dislike to totally like (7 categories, 1-7 scale) or on a purchase intent scale from definitely would not purchase to definitely would purchase. Another example would be the more traditional continuous variable where are there are a large number of possible values (temperature, income, sales, weight, etc.).

For example in eliciting information if the "Other" category is selected by the user, the expert system may present one or more additional questions to determine the dependent variable and/or whether the dependent variable is continuous or discrete.

Figure 3E:
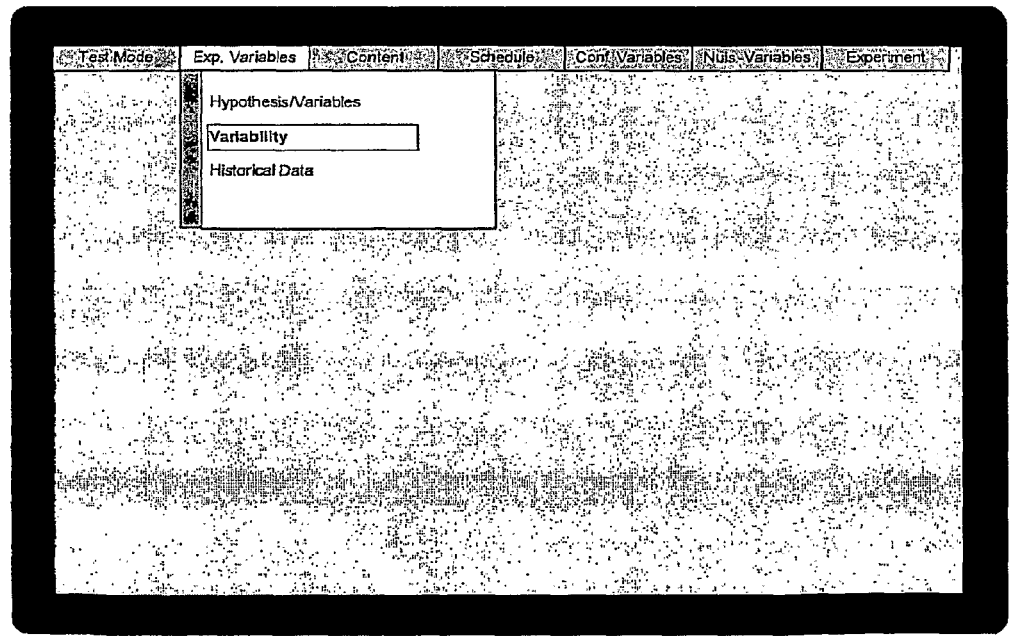
Figures 3F, 3G:
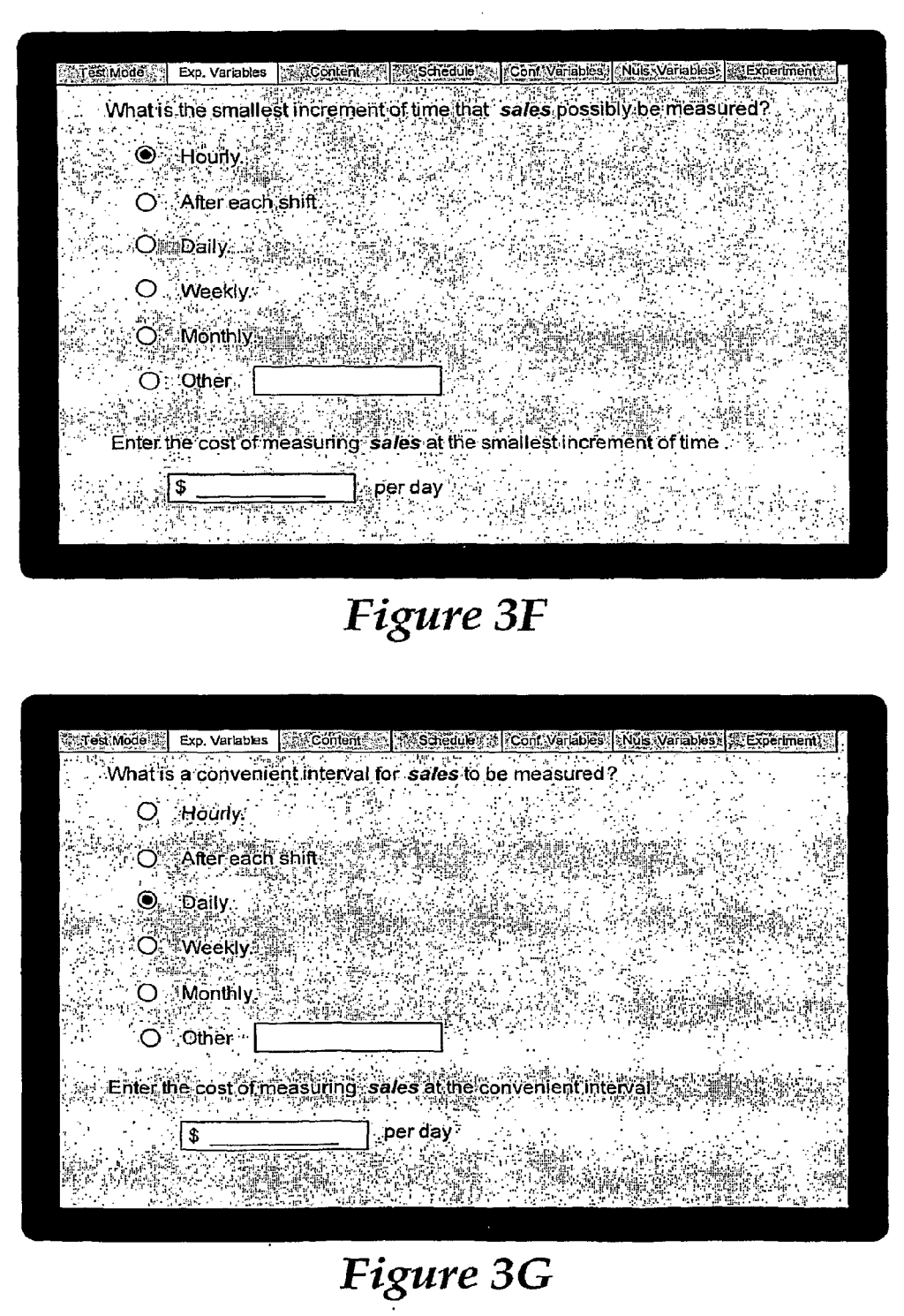

The expert system may lead the user through a series of questions to obtain information needed to perform a power analysis. Parameters that are used for the power analysis include the mean under the null hypothesis, standard deviation, mean under the test hypothesis, significance level, power, and sample size. Information about some of these parameters is obtained from the user while others are standard values programmed into the expert system. After determining possible dependent variables, the expert system may activate processes associated with the sub-menu item titled "Variability" as indicated in FIG. 3E. In these processes, the expert system leads the user through a series of questions designed to determine the variability of the possible dependent variables. Determination of the variability of the possible dependent variables provides information for use by the expert system to evaluate the statistical power of the experiment. For example, the expert system may pose questions to collect information about the granularity of available data such as those indicated in FIGS. 3F and 3G. In FIG. 3F, the expert system presents a question to obtain information about the lower bound of the granularity of the available data. As indicated in FIG. 3F, the question "What is the smallest increment of time that sales can possibly be measured" provides the following choices; hourly, after each shift, daily, weekly, monthly, or other. In this particular case, the user has indicated that the smallest unit of time that sales can be measured is hourly. On the screen shot depicted in FIG. 3F, the expert system also prompts the user to input the cost associated with measuring data at the smallest time increment.

As depicted in FIG. 3G, the expert system also obtains information about a convenient increment of time for obtaining data. In the screen shot illustrated in FIG. 3G, the expert system inquires about a convenient increment of time that sales can be measured. Again, the user is prompted to choose between hourly, after each shift, daily, weekly, monthly, or other. The cost associated with obtaining data at the convenient increment is also requested as indicated in FIG. 3G.

Figure 3H:
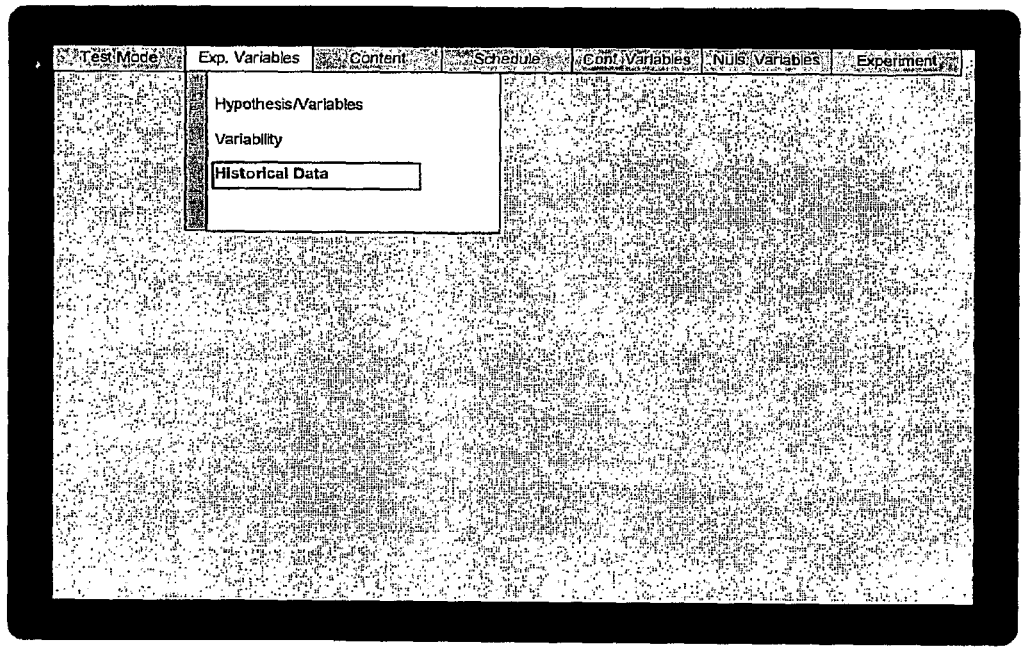
Figure 3I:
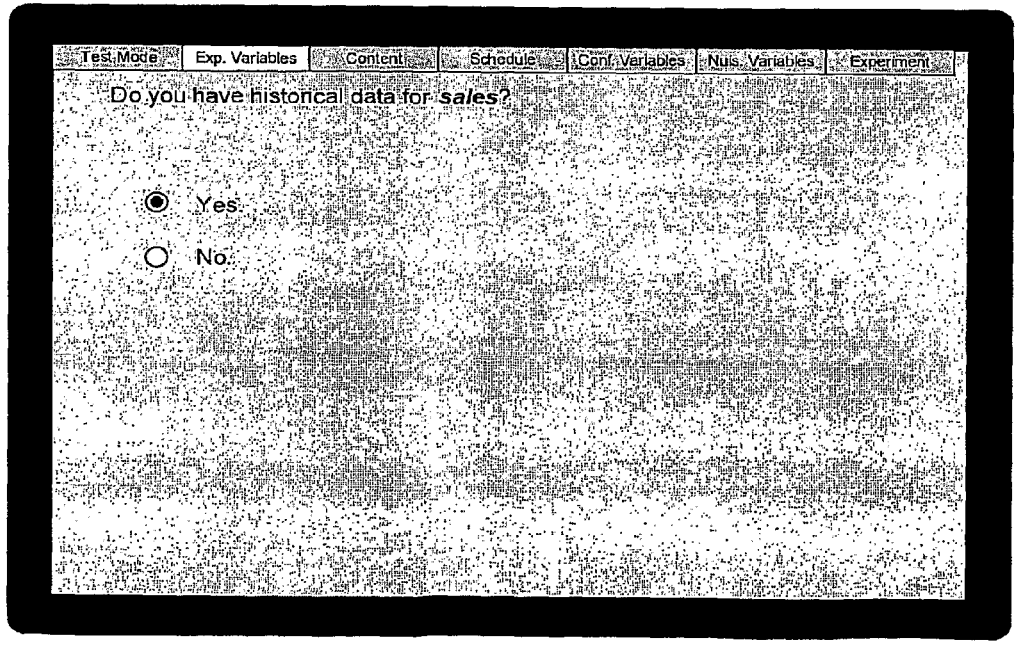
Figures 3J, 3K:
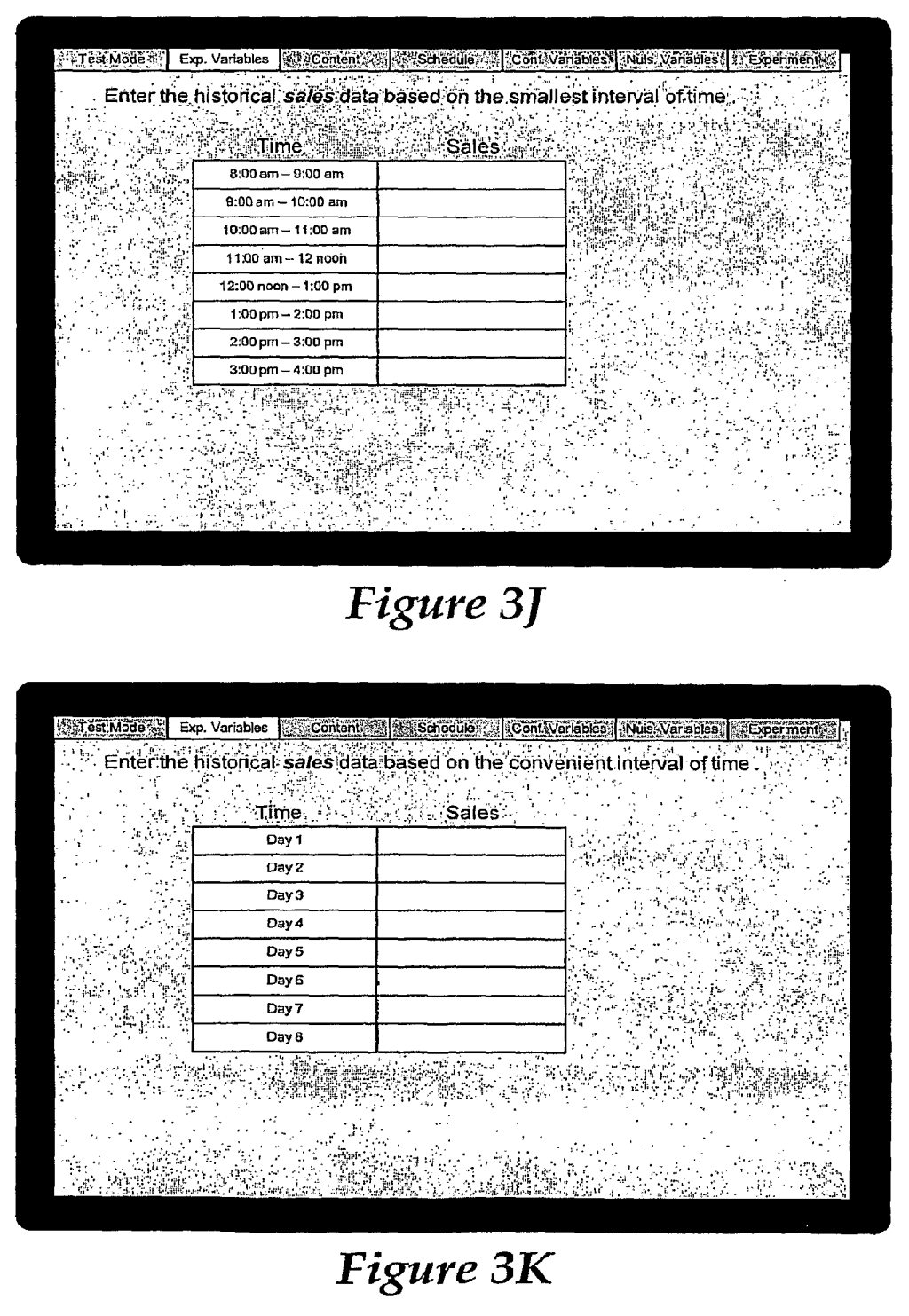

The expert system may activate processes associated with the sub-menu item titled "Historical Data" as indicated in FIG. 3H. The user is prompted to indicate whether or not historical sales data is available (FIG. 3I). A positive response triggers the screens depicted in FIGS. 3J and 3K which allow the user to enter sales data for the smallest increment of time and the convenient increment of time, respectively. The historical sales data may be used, for example, to estimate the standard deviation for the dependent variable (sales in this example) for use in a power analysis to determine the statistical power of the experiment. The number of entries elicited by the screens shown in FIGS. 3J and 3K is determined by the computer, based on a desired confidence level and the standard deviation. For example, the computer may prompt the user to provide information for a certain number of entries that are needed to estimate the standard deviation so as to achieve a particular level of confidence that the standard deviation will fall within a particular range.

The level of confidence used for the standard deviation, e.g., 90% or 95%, is typically transparent to the user, although it may be a programmable value of the expert system. Certain values used by the expert system, such as the confidence level for the standard deviation of the dependent variable described above, and the significance level of the experiment, may be programmable at the time a system is configured. These configuration values may be later changed, for example, by an administrator familiar with the expert system software.

Figure 3L:
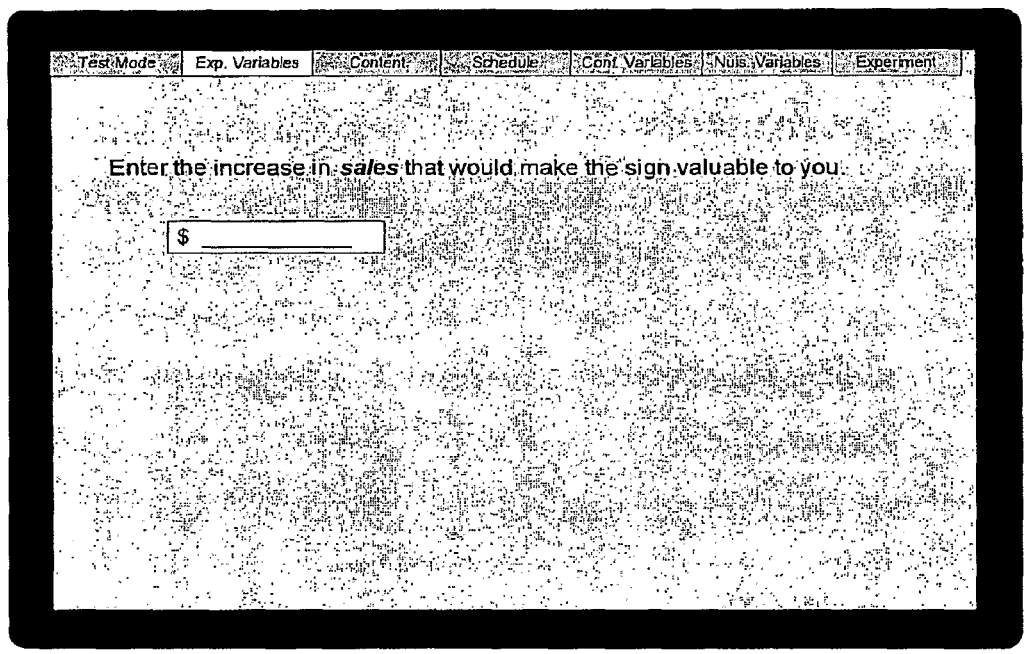

The expert system may present questions to the user to obtain information related to the effects of the experiment. FIG. 3L is a screen shot illustrating a question that may be presented to the user to determine the minimum effect size. In this example, the expert system requests that the user enter the increase in sales that would make the content valuable.

Figure 3M:
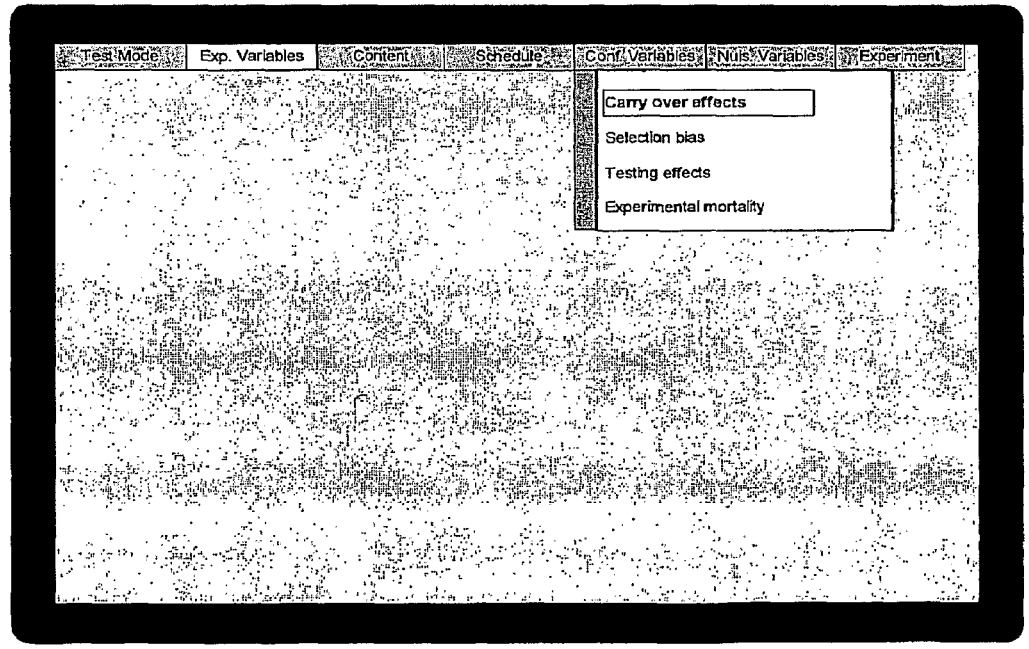
Figures 3N, 3O:
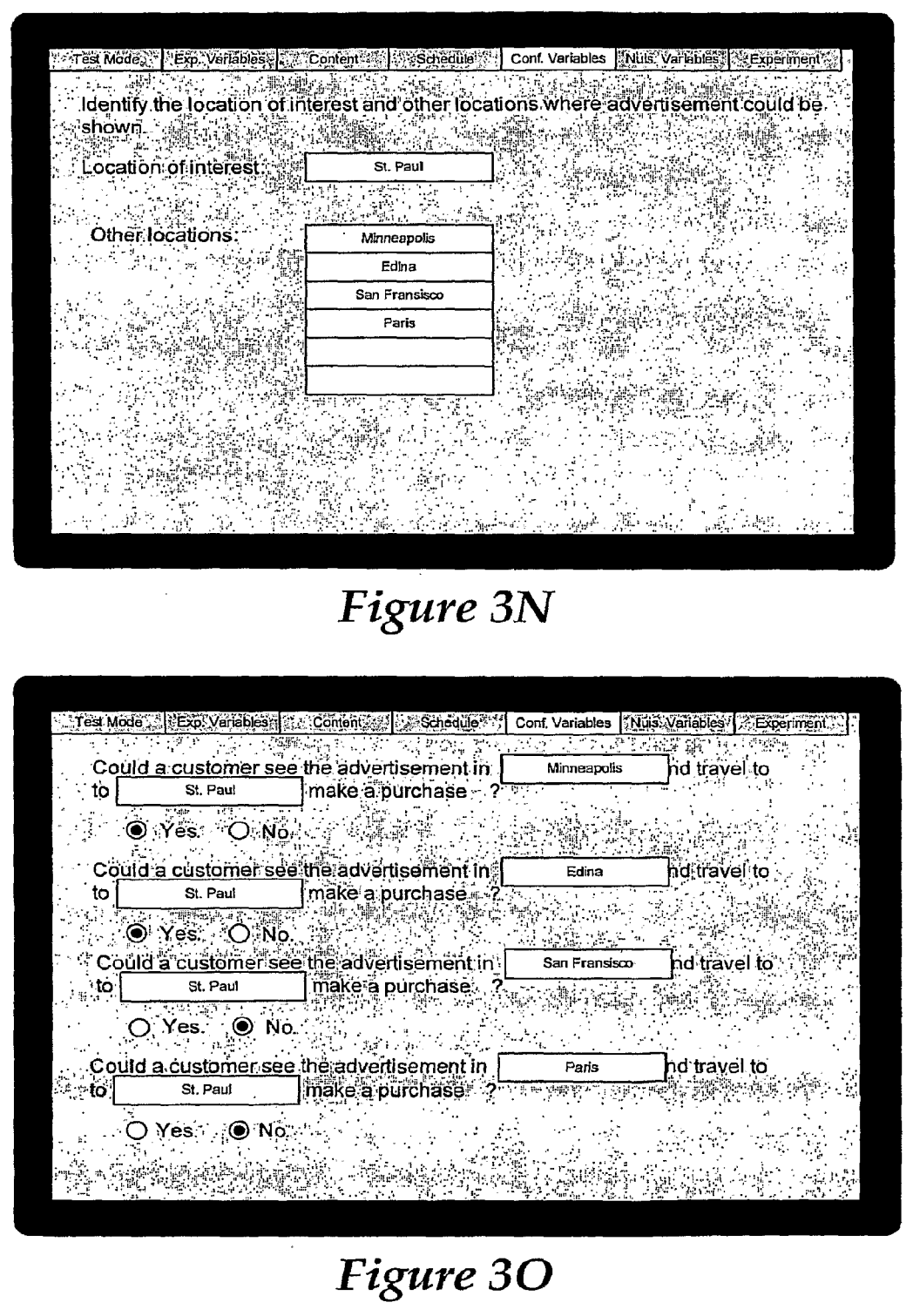
Figure 3P:
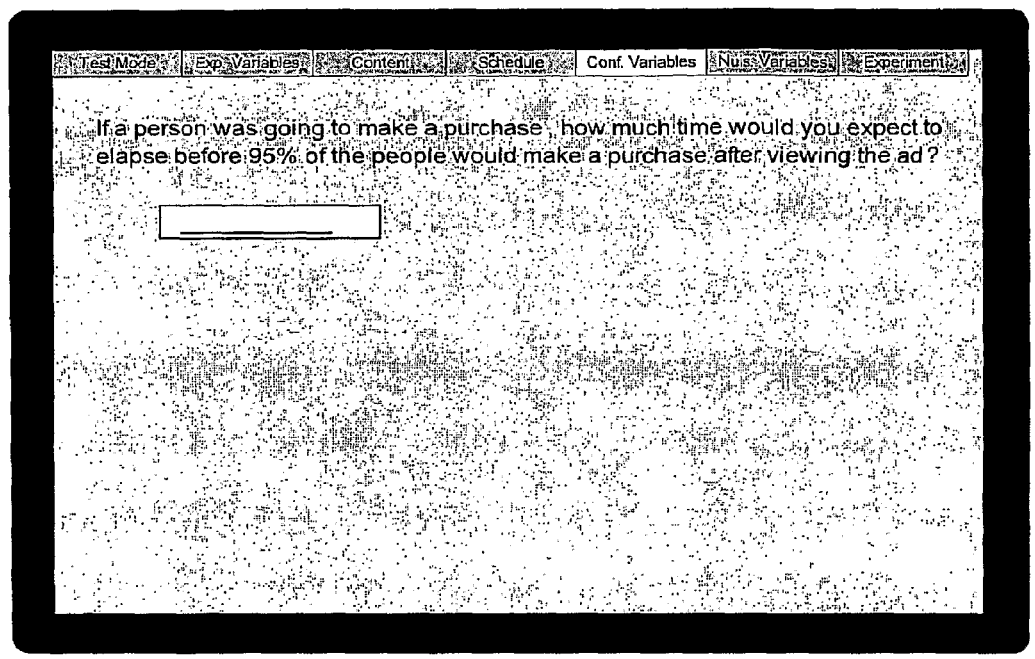

To design a true experiment, the expert system acquires information about possible confound and/or nuisance variables that may affect the experiment. For example, confound variables may be associated with carry over effects, selection bias, testing effects and experimental mortality. As indicated in the screen of FIG. 3M, a menu item for each of these factors may be activated leading to a series of questions presented to the user to acquire information about these factors. In FIG. 3M, the menu item carry over effects is highlighted. Activation of the carry over effects menu item leads to the question presented in FIGS. 3N-3P. In FIG. 3N, the expert system presents a question that leads the user to reveal information about other locations that the content could be shown. In FIGS. 3O and 3P, the expert system presents questions that lead the user to reveal information about the timing of carry over effects.

Figure 4A:
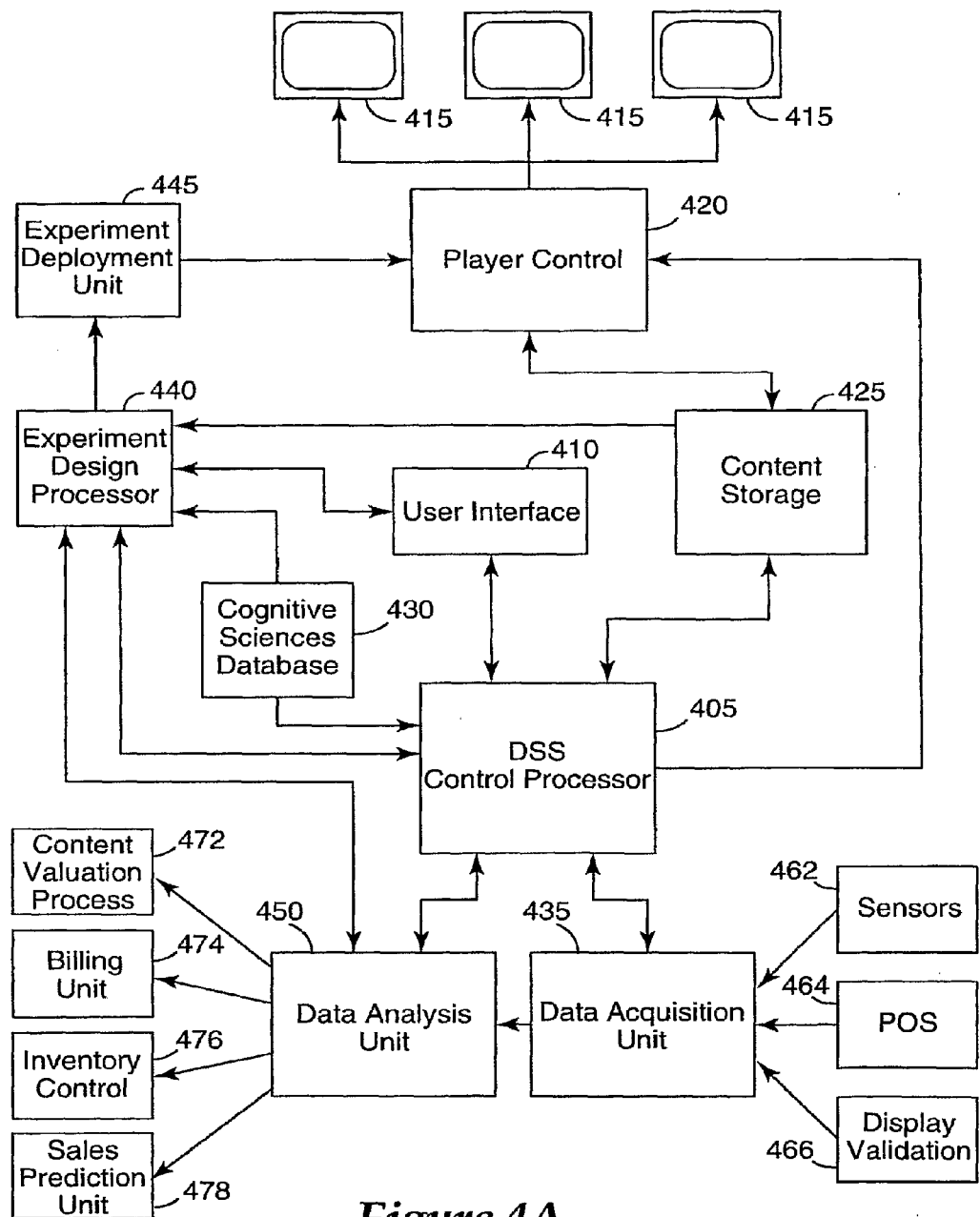
FIG. 4A is a block diagram of a digital signage system that may incorporate the capability for designing true experiments to test the effectiveness of digital signage content in accordance with embodiments of the invention.

FIG. 4A is a block diagram of a digital signage system (DSS) that may incorporate the capability for designing true experiments to test the effectiveness of digital signage content in accordance with embodiments of the invention. The block diagram of FIG. 4A illustrates one configuration of a DSS divided into functional blocks. Those skilled in the art will appreciate that the DSS may be alternatively illustrated using different function blocks and that various components of the DSS may be implemented as hardware, software, firmware, or any combination of hardware, software and firmware.

A system according to the present invention may include one or more of the features, structures, methods, or combinations thereof described herein. For example, a system may be implemented to include one or more of the advantageous features and/or processes illustrated in FIG. 4A. It is intended that such a system need not include all of the features described herein, but may be implemented to include selected features that provide for useful structures and/or functionality.

The DSS illustrated in FIG. 4A is a computerized system configured to present informational content via audio, visual, and/or other media formats. The DSS may include functionality to automatically or semi-automatically generate playlists, which provide a list of the information content to be presented, and schedules, which define an order for the presentation of the content. In a semi-automatic mode, a user may access a DSS control processor 405 via an interactive user interface 410. Assisted by the DSS control processor 405, the user may identify content to be presented and generate playlists and schedules that control the timing and order of presentations on one or more DSS players 415. Each player 415 presents content to recipients according to a playlist and schedule developed for the player. The informational content may comprise graphics, text, video clips, still images, audio clips, web pages, and/or any combination of video and/or audio content, for example.

In some implementations, after a playlist and schedule are developed, the DSS control processor 405 determines the content required for the playlist, downloads the content from a content server, and transfers the content along with the playlist and schedule to a player controller 420 that distributes content to the players 415. Although FIG. 4A shows only one player controller 420, multiple player controllers may be coupled to a single DSS control processor 405. Each player controller 420 may control a single player or multiple players 415. The content and/or the playlists and schedules may be transferred from the DSS control processor 405 to the one or more player controllers 420 in a compressed format with appropriate addressing providing information identifying the player 415 for which the content/playlist/schedule is intended. In some applications, the players 415 may be distributed in stores and the content presented on the players 415 may be advertisements.

In other implementations, the DSS control processor 405 may transfer only the playlists and schedules to the player controller 420. If the content is not resident on the player controller 420, the player controller 420 may access content storage 425 to acquire the content to be presented. In some scenarios, one or more of the various components of the DSS system, including the content storage 425, may be accessible via a network connection, such as an intranet or Internet connection. The player controller 420 may assemble the desired content, or otherwise facilitate display of the desired content on the players according to the playlist and schedule. The playlists, schedules, and/or content presented on the players 415 can be modified periodically or as desired by the user through the player controller 420, or through the DSS control processor 405, for example.

In some implementations, the DSS control processor 405 facilitates the development and/or formatting of a program of content to be played on a player. For example, the DSS control processor 405 may facilitate formatting of an audiovisual program through the use of a template. The template includes formatting constraints and/or rules that are applied in the development of an audiovisual program to be presented. For example, the template may include rules associated with the portions of the screen used for certain types of content, what type of content can be played in each segment, and in what sequence, font size, and/or other constraints or rules applicable to the display of the program. A separate set of rules and/or constraints may be desirable for each display configuration. In some embodiments, formatting a program for different displays may be performed automatically by the DSS control processor 405.

In some embodiments, the DSS may create templates, generate content, select content, assemble programs, and/or format programs to be displayed based on information acquired through research and experimentation in the area of cognitive sciences. Cognitive science seeks to understand the mechanisms of human perception. The disciplines of cognitive and vision sciences have generated a vast knowledge base regarding how human perceptual systems process information, the mechanisms that underlie attention, how the human brain stores and represents information in memory, and the cognitive basis of language and problem solving. Application of the cognitive sciences to content design, layout, formatting, and/or content presentation yields information that is easily processed by human perceptual systems, is easy to understand, and is easily stored in human memory. Knowledge acquired from the cognitive sciences and stored in a cognitive sciences database 430 may be used automatically or semi-automatically to inform one or more processes of the DSS including creation of templates, content design, selection of content, distribution of content, assembly of programs, and/or formatting of programs for display. The cognitive sciences database 430 used in conjunction with the programming of the DSS yields advertisements or other digital signage programs that are enhanced by the teachings of cognitive science, while relieving the system user from needing specific training in the field.

In development of a digital signage program, e.g., ad campaign or the like, the DSS control processor 405 may guide a user through various processes that are enhanced using knowledge acquired through the cognitive sciences. For example, information stored in the cognitive sciences database 430 may be applied to the choice of templates to produce an optimal program layout and/or to the selection of content, such as whether content elements should be graphical, text, involve movement, color, size, and/or to the implementation of other aspects of program development.

The DSS may include the capability for designing alternative versions of a digital signage program to accommodate diverse display types and viewing conditions. Display technology is diverse and there are large differences in the types of displays used to present content on a digital signage network. For example, the size, shape, brightness, and viewing conditions will vary greatly across a digital signage network (e.g., some displays may be small, flexible and non-rectilinear, whereas others may be standard large format Liquid Crystal Display (LCD) and plasma displays). The variation in display types and viewing conditions means that any single version of a piece of content may not be optimal for all the displays across a network. In order to overcome this problem, it may be necessary to generate versions of each piece of content for each display type and viewing environment, and to selectively distribute these versions of content to their corresponding screens in the network. However, it is not realistic to expect content designers to have such detailed knowledge of the display types and viewing conditions across a large DSS network. Furthermore, even if such content designers had such detailed knowledge, it would be time-consuming to manually create versions of content for each display and to manually schedule the content to play on each corresponding display at the appropriate time.

The DSS may include a data acquisition unit 435 for collecting data used to improve the effectiveness of deployed content. The data acquisition unit 435 allows distribution factors that underlie the effectiveness of digital signage networks to be continuously gathered in real-time during deployment of content. The information acquired can facilitate continuous improvement in content effectiveness of the DSS as well as improvement of individual versions of content pieces.

Previously acquired data may be used to learn what sensor or sales events should trigger the display of specific types of content, for example.

Individual pieces of content in any content program each have a specific goal (e.g., to sell a specific product). It is usually the case that there is variability in the value of each goal to the user of the digital signage network. For example, there may be variability in the profit margin and inventory level for each product which factor into the value of the goal for the product. The value of achieving each goal continuously changes during the time a digital signage program is deployed. For example, the inventory level of a product may change, thus affecting the goal for sales of the product.

Enhancing the effectiveness of a DSS as a whole, involves 1) accurate prediction of the impact of deploying a digital signage program on the goal associated with the digital signage program, and 2) continuously changing the distribution patterns (timing, frequency, and location) of individual pieces of content as the value of each individual goal corresponding to the pieces of content change. In many cases, it is unfeasible for users of the DSS to predict the impact of deploying content and to manually change content distribution patterns based on continuously changing values of goals associated with each piece of content. The DSS provides the functionality to predict the impact of digital signage programs and to alter the distribution of content based on the predictions.

As previously stated, content is displayed on the players 415 with the goal of affecting human behavior (e.g., to impact purchasing behavior). However, prior digital signage systems are unable to demonstrate a cause-and-effect relationship between signage content and human behavior or to measure the strength of the cause and effect relationship. This difficulty arises because the methods by which content is delivered across current digital signage networks does not support the determination of whether any measured change in human behavior was caused by signage content or the result of some confounding factors (e.g., change in weather, change in general demand for the product, change in price of the product). The only way to decisively determine cause-and-effect relationships between signage content and human behavior is to conduct a true experiment during which signage content is systematically manipulated using complex experimental designs, and the effects of those manipulations on human behavior are carefully measured. Manually conducting such experiments is time consuming and requires significant knowledge and training in the scientific method of how to design true experiments. The users of digital signage systems may not have sufficient training to understand how to design a true experiment to acquire confound-free results. The DSS illustrated in FIG. 4A includes a experiment design processor 440 and user interface 410 that provide the capability to design true experiments.

Figure 4B:
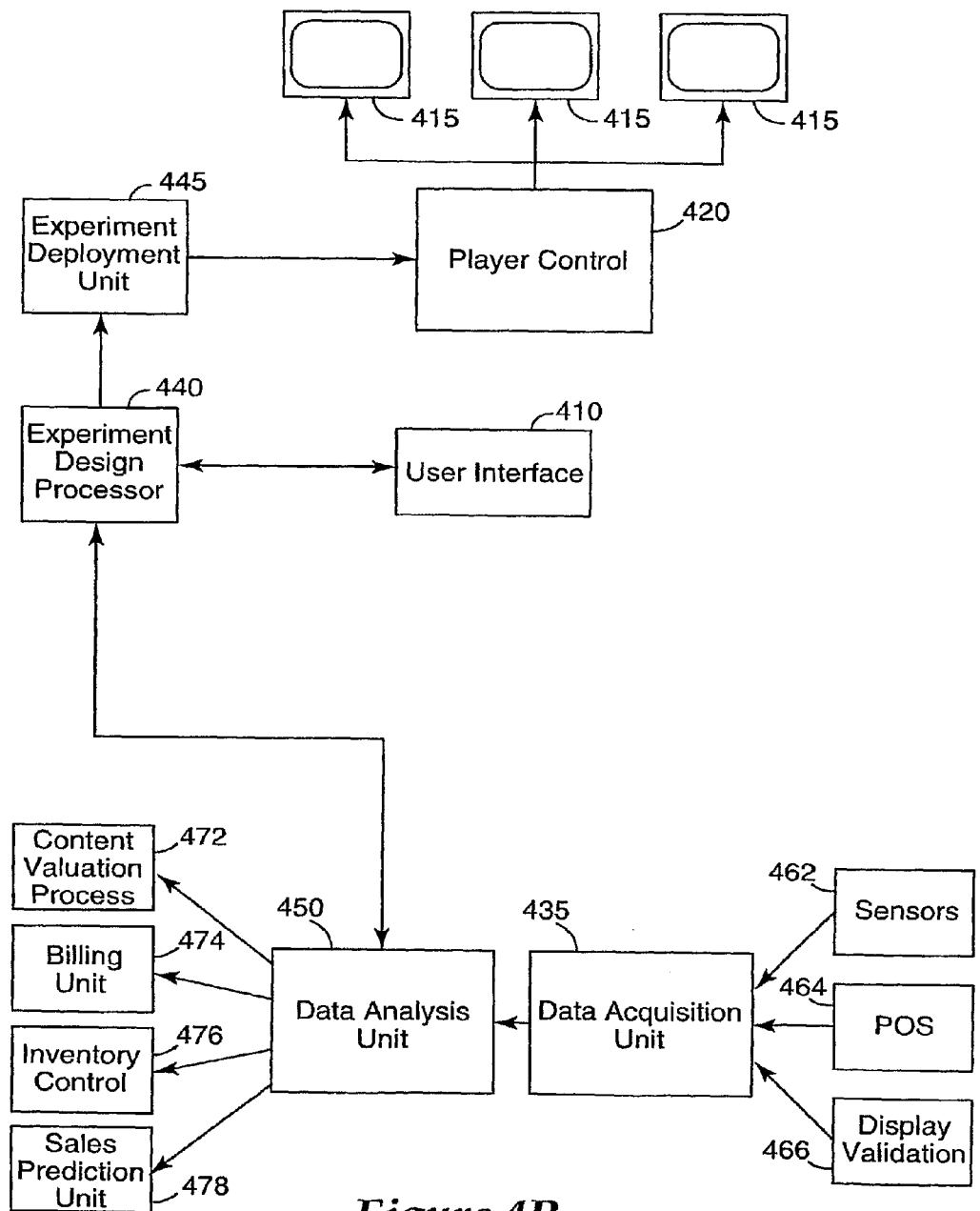
FIG. 4B illustrates a system including that is configured to design, conduct and analyze a true experiment to evaluate digital signage content in accordance with embodiments of the invention.

FIG. 4B illustrates an expert system including experiment design processor that is configured to design a true experiment. As previously discussed, the experiment design processor 440 may be configured to operate fully automatically or semi-automatically with user interaction. In semi-automatic mode, the experiment design processor 440 may lead a user through various interactive sessions conducted via the user interface 410 to design a true experiment. In such a process, the experiment design processor 440 ensures the design of a true experiment that produces confound-free data. Thus, a user is able to rely on the programming of the experiment design processor 440 and is not required to have knowledge or experience in designing true experiments. The DSS may comprise only an experiment design processor 440, or may include additional elements such as an experiment deployment unit 445, a data acquisition unit 435, and data analysis unit 450.

The experiment design processor 440 may, automatically or semi-automatically, develop an objective or hypothesis for the experiment, identify independent and dependent variables of the experiment, form control and treatment groups applying appropriate randomization, balancing, counterbalancing and/or blocking. In the context of a DSS, for example, the experimental objective may be to evaluate the effectiveness of a content element in an ad campaign promoting sales of a certain product. The independent variable(s) may be associated with some aspect of the display of the content element. The dependent variable(s) may be associated with an increase in sales of the product.

The experiment design processor 440 may form appropriate treatment and control groups including the selection of various venues of the DSS where the experimental content and control content is to be displayed. Presentation of the experimental content, including content format, schedule, presentation location, and/or other factors that may produce confounds into the experimental process, are controlled by the experiment design processor 440. The experiment design processor 440 may ensure adequate randomization, counterbalancing, and blocking of the control and treatment groups to achieve experimental results that are substantially confound-free. Design of the experiment in the context of the DSS system may involve, for example, generating appropriate playlists and schedules for the presentation of content to be tested via the experiment, and may also involve generating playlists and schedules for presentation of control content.

In some configurations, the expert system may further include an experiment deployment unit 445. The experiment deployment unit 445 is configured to facilitate deployment of the experiment. In the context of the exemplary DSS system, the experiment deployment unit 445 formats the experimental content and the control group content for various player configurations and facilitates the transfer of the experimental content and the control content to the player controller 420 for presentation on players 415 as specified by the playlists and schedules.

The data acquisition unit 435 may be configured to collect experimental data from the control and treatment groups. The data acquisition unit 435 may perform or facilitate acquisition of data associated with the experiment via any means. For example, in the context of the exemplary DSS, the data acquisition unit 435 may be coupled to various sensor or data acquisition devices 462, 464, 466 that gather information including product movement, product sales, customer actions or reactions, and/or other information. Sensors 462 may be used to detect, for example, if a customer picks up the product, or if a customer is in the vicinity of the display when the content is displayed. Sales may be determined based on information acquired by a point of sales (POS) system 464. One or more devices 466 that validate the display of content may also be used. Changes in inventory levels of a product may be available via an inventory control system. Customer reactions may be acquired via questionnaires. If the conducted experiment is a true experiment, the data acquired by the data acquisition unit 435 is substantially confound-free.

The data acquisition unit 435 may be coupled to a data analysis unit 450 that is configured to analyze the experimental data collected by the data acquisition unit 435. The data analysis unit 450 may determine and/or quantify cause and effect relationships between the independent and dependent variables of the experiment. For the illustrated DSS, the results of the analysis may be used to determine if the content is effective at influencing product sales.

Because the analysis unit 450 will have received information regarding the independent and independent variables (e.g., whether the IVs and DVs are continuous or discrete), the analysis unit 450 would have much of the necessary information to choose the appropriate statistical test to apply to the data from the experiment. For example, if there is one IV with two discrete levels and one continuous DV, then a T-Test would be used for the inferential statistical test whereas if there is one IV with two discrete levels and one DV with two discrete levels, then a Chi-Squared test would be used for the inferential statistical test. Likewise, because analysis unit will access to information from the design processor 440 regarding which experimental conditions are diagnostic of particular hypotheses, the analysis unit 450 would have most or all of the information needed to determine which experimental and control conditions should be statistically compared.

The results of the analysis may be additionally or alternatively used to implement or modify various processes. For example, if the content was effective at influencing product sales, an advertisement campaign may be developed incorporating the content. A value may be assigned to the content by a content valuation process 472 based on the effectiveness of increasing sales. An advertiser using the content may be invoiced by a billing unit 474 according the value of the content. The data analysis unit 450 may also provide information to inventory control 476. Additionally, the data analysis unit 450 may provide information to a sales prediction unit 478 that generates a prediction of sales when the advertising campaign is deployed. The sales prediction unit 478 may additionally or alternatively predict the product inventory needed to support the sales generated by the advertisement campaign.

Using the description provided herein, the invention may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the invention. As such, the terms "article of manufacture" and "computer program product" as used herein are intended to encompass a computer program that exists permanently or temporarily on any computer-usable medium or in any transmitting medium which transmits such a program.

Implementation of a digital signage system, including capabilities for generating digital signage content, deploying experiments designed by the expert system, and collecting experimental data are further described in U.S. patent application Ser. No. 11/321,340 filed Dec. 29, 2005 which is incorporated herein by reference.

The foregoing description of the various embodiments of the invention has been presented for the purposes of illustration and description. It is not intended to be exhaustive or to limit the invention to the precise form disclosed. Many modifications and variations are possible in light of the above teaching. For example, embodiments of the present invention may be implemented in a wide variety of applications. It is intended that the scope of the invention be limited not by this detailed description, but rather by the claims appended hereto.

What is claimed is:

1. A computer-implemented method for designing a true experiment for evaluating effectiveness of a piece of content on influencing a particular behavior of viewers in a digital signage system having a plurality of displays, the method comprising:
    identifying information required to design the true experiment to evaluate the piece of content, the identified information comprising information on a schedule confounding variable and a dependent variable that is associated with the behavior of the viewers of the piece of content, wherein the behavior of at least some of the viewers of the piece of content is exhibited independently from an interaction with a display in the digital signage system;
    presenting questions to a user, the questions eliciting responses that provide the required information, wherein at least one of the questions is related to the timing of content that could produce carry over effects;
    receiving the responses to the questions from the user;
    extracting the required information from the user responses; and
    designing, by a processor, the true experiment based on the required information extracted from the user responses,
    wherein the designed experiment controls presentation of the piece of content on the plurality of displays in the digital signage system,
    wherein the designed experiment controls for carry over effects by balancing and counterbalancing an order with which pieces of content are shown at locations across the digital signage system.

2. The method of claim 1, wherein designing the true experiment comprises determining a control group and a treatment group for the true experiment based on information extracted from the user responses, wherein the control group is exposed to the piece of content.

3. The method of claim 1, wherein designing the true experiment comprises determining a schedule for the piece of content based on the information extracted from the user responses.

4. The method of claim 3, wherein determining the schedule comprises determining one or more playlists for the piece of content based on the information extracted from the user responses.

5. The method of claim 3, wherein determining the schedule comprises determining one or more venues for the piece of content based on the information extracted from the user responses.

6. A system for designing a true experiment for evaluating effectiveness of a piece of content on influencing a particular behavior of viewers in a digital signage system having a plurality of displays, the system comprising:
    a user interface configured to present questions to a user and receive user responses to the questions, wherein at least one of the questions is related to the timing of content that could produce carry over effects; and
    an experimental design processor coupled to the user interface and configured to identify information required to perform a true experiment, generate questions eliciting responses from the user that provide the required information, extract the required information from the user responses, and design a true experiment using the required information,
    wherein the identified information comprises information associated with a dependent variable that is associated with the behavior of the viewers of the piece of content, wherein the behavior of at least some of the viewers of the piece of content is exhibited independently from an interaction with a display in the digital signage system, and wherein the designed experiment controls presentation of the piece of content on the plurality of displays in the digital signage system, wherein the designed experiment controls for carry over effects by balancing and counterbalancing an order with which pieces of content are shown at locations across the digital signage system.

7. The system of claim 6, wherein the required information comprises information associated with one or more levels of an independent variable of the true experiment.

8. The system of claim 6, wherein the required information comprises information associated with one or both of confound variables and nuisance variables of the true experiment.

9. The system of claim 6, wherein the required information comprises information associated with a hypothesis of the true experiment.

10. The system of claim 6, wherein the true experiment evaluates digital signage content.

11. The system of claim 6, further comprising an experimental control processor configured to control performance of the true experiment.

12. The system of claim 6, further comprising an analysis unit configured to analyze experimental data produced by the true experiment.

13. The system of claim 12, wherein the analysis unit is configured to use information acquired by the design processor to analyze the experimental data.

14. A non-transitory computer-readable medium having instructions stored thereon and executable by a computing device to perform steps comprising:

identifying information required to design a true experiment for evaluating effectiveness of a piece of content on influencing a particular behavior of viewers in a digital signage system having a plurality of displays;

presenting questions to a user, the questions eliciting responses that provide the required information, wherein at least one of the questions is related to the timing of content that could produce carry over effects;

receiving the responses to the questions from the user;

extracting the required information from the user responses; and designing the true experiment based on the required information extracted from the user responses, wherein the identified information comprises information on a dependent variable that is associated with the behavior of the viewers of the piece of content, wherein the behavior of at least some of the viewers of the piece of content is exhibited independently from an interaction with a display in the digital signage system, and wherein the designed experiment controls presentation of the piece of content on the plurality of displays in the digital signage system, wherein the designed experiment controls for carry over effects by balancing and counterbalancing an order with which pieces of content are shown at locations across the digital signage system.

15. A system for designing a true experiment for evaluating effectiveness of a piece of content on influencing a particular behavior of viewers in a digital signage system having a plurality of displays, the system comprising:

means for identifying information required to design a true experiment;

means for presenting questions to a user, the questions eliciting responses that provide the required information, wherein at least one of the questions is related to the timing of content that could produce carry over effects;

means for receiving the responses to the questions from the user;

means for extracting the required information from the user responses; and means for designing the true experiment based on the required information extracted from the user responses, wherein the identified information comprises information on a dependent variable that is associated with the behavior of the viewers of the piece of content, wherein the behavior of at least some of the viewers of the piece of content is exhibited independently from an interaction with a display in the digital signage system, and wherein the designed experiment controls presentation of the piece of content on the plurality of displays in the digital signage system, wherein the designed experiment controls for carry over effects by balancing and counterbalancing an order with which pieces of content are shown at locations across the digital signage system.

16. The system of claim 15, further comprising means for conducting the true experiment.

17. The system of claim 15, further comprising means for analyzing experimental data produced by the true experiment.

* * * * *

UNITED STATES PATENT AND TRADEMARK OFFICE
CERTIFICATE OF CORRECTION

PATENT NO. : 8,594,990 B2  
APPLICATION NO. : 12/159107  
DATED : November 26, 2013  
INVENTOR(S) : Brian E Brooks Page 1 of 1

It is certified that error appears in the above-identified patent and that said Letters Patent is hereby corrected as shown below:

In the Specification

Column 8
Line 55; Delete "(UVs)" and insert -- (IVs) --, therefor.

Signed and Sealed this
Seventeenth Day of June, 2014

Michelle K. Lee
*Deputy Director of the United States Patent and Trademark Office*